US008984417B2

(12) United States Patent
Audet

(10) Patent No.: US 8,984,417 B2
(45) Date of Patent: Mar. 17, 2015

(54) METHOD OF ASSOCIATING ATTRIBUTES WITH DOCUMENTS

(75) Inventor: Mathieu Audet, Montreal (CA)

(73) Assignee: 9224-5489 Quebec Inc., Montreal (CA)

( * ) Notice: Subject to any disclaimer, the term of this patent is extended or adjusted under 35 U.S.C. 154(b) by 447 days.

(21) Appl. No.: 13/528,359

(22) Filed: Jun. 20, 2012

(65) Prior Publication Data

US 2012/0260204 A1 Oct. 11, 2012

Related U.S. Application Data

(63) Continuation of application No. 12/559,128, filed on Sep. 14, 2009, now Pat. No. 8,607,155.

(60) Provisional application No. 61/096,655, filed on Sep. 12, 2008.

(51) Int. Cl.
| G06F 3/00 | (2006.01) |
| G06Q 10/10 | (2012.01) |
| G06F 3/0481 | (2013.01) |
| G06F 17/30 | (2006.01) |
| G06Q 10/06 | (2012.01) |

(52) U.S. Cl.
CPC .............. *G06Q 10/10* (2013.01); *G06F 3/0481* (2013.01); *G06F 17/30011* (2013.01); *G06Q 10/06* (2013.01)
USPC ........................................................ 715/748

(58) Field of Classification Search
USPC ........................................................ 715/748
See application file for complete search history.

(56) References Cited

U.S. PATENT DOCUMENTS

| 4,616,336 A | 10/1986 | Robertson |
| 4,653,021 A | 3/1987 | Takagi |
| 4,817,036 A | 3/1989 | Millett et al. |
| 5,115,504 A | 5/1992 | Belove |
| 5,148,154 A | 9/1992 | MacKay |
| 5,241,624 A | 8/1993 | Torres |
| 5,261,087 A | 11/1993 | Mukaino |
| 5,388,197 A | 2/1995 | Rayner |
| 5,398,074 A | 3/1995 | Duffield |

(Continued)

FOREIGN PATENT DOCUMENTS

| JP | 07-013971 | 1/1995 |
| JP | 07-085080 | 3/1995 |

(Continued)

OTHER PUBLICATIONS

The lifestream approach to reorganizing the information world; Nicolas Carriero, Scott Fertig; Eric Freeman and David Gelernter; Apr. 1995; Yale University.

(Continued)

*Primary Examiner* — Boris Pesin
*Assistant Examiner* — Angie Badawi
(74) *Attorney, Agent, or Firm* — Mathieu Audet

(57) ABSTRACT

A method of adding a user-selectable element to a destination array of documents, the method comprising adding a document to the destination array of documents, the destination array of documents being adapted to group a plurality of documents having a commonality, the added document being adapted to acquire the commonality by being added to the destination array of documents. A tangible machine-readable medium and a graphical user interface providing same are also provided herewith.

20 Claims, 21 Drawing Sheets

(56) References Cited

U.S. PATENT DOCUMENTS

| | | |
|---|---|---|
| 5,414,811 A | 5/1995 | Parulski et al. |
| 5,499,330 A | 3/1996 | Lucas et al. |
| 5,524,195 A | 6/1996 | Clanton |
| 5,535,063 A | 7/1996 | Lamming |
| 5,546,528 A | 8/1996 | Johnston |
| 5,581,752 A | 12/1996 | Inoue |
| 5,598,519 A | 1/1997 | Narayanan |
| 5,602,596 A | 2/1997 | Claussen |
| 5,606,374 A | 2/1997 | Bertram |
| 5,621,456 A | 4/1997 | Florin |
| 5,621,874 A | 4/1997 | Lucas |
| 5,623,613 A | 4/1997 | Rowe |
| 5,634,064 A | 5/1997 | Warnock |
| 5,649,182 A | 7/1997 | Reitz |
| 5,659,742 A | 8/1997 | Beattie |
| 5,663,757 A | 9/1997 | Morales |
| 5,671,381 A | 9/1997 | Strasnick |
| 5,673,401 A | 9/1997 | Volk |
| 5,677,708 A | 10/1997 | Matthews |
| 5,680,605 A | 10/1997 | Torres |
| 5,682,511 A | 10/1997 | Sposato |
| 5,701,500 A | 12/1997 | Ikeo |
| 5,713,031 A | 1/1998 | Saito |
| 5,740,815 A | 4/1998 | Alpins |
| 5,781,188 A | 7/1998 | Amiot |
| 5,781,785 A | 7/1998 | Rowe |
| 5,794,178 A | 8/1998 | Caid |
| 5,798,766 A | 8/1998 | Hayashi et al. |
| 5,812,124 A | 9/1998 | Eick |
| 5,822,751 A | 10/1998 | Gray |
| 5,832,504 A | 11/1998 | Tripathi |
| 5,838,317 A | 11/1998 | Bolnick |
| 5,838,326 A | 11/1998 | Card |
| 5,847,707 A | 12/1998 | Hayashida |
| 5,850,218 A | 12/1998 | Lajoie |
| 5,878,410 A | 3/1999 | Zbikowski |
| 5,900,879 A | 5/1999 | Berry |
| 5,903,271 A | 5/1999 | Bardon |
| 5,905,992 A | 5/1999 | Lucas |
| 5,920,859 A | 7/1999 | Li |
| 5,926,824 A | 7/1999 | Hashimoto |
| 5,933,843 A | 8/1999 | Takai |
| 5,974,391 A | 10/1999 | Hongawa et al. |
| 5,977,974 A | 11/1999 | Hatori et al. |
| 5,980,096 A | 11/1999 | Thalhammer-Reyero |
| 5,982,369 A | 11/1999 | Sciammarella |
| 6,003,034 A | 12/1999 | Tuli |
| 6,005,601 A | 12/1999 | Ohkura |
| 6,006,227 A | 12/1999 | Freeman |
| 6,009,442 A | 12/1999 | Chen |
| 6,012,072 A | 1/2000 | Lucas |
| 6,020,930 A | 2/2000 | Legrand |
| 6,023,703 A | 2/2000 | Hill |
| 6,028,600 A | 2/2000 | Rosin |
| 6,029,164 A | 2/2000 | Birrell |
| 6,037,933 A | 3/2000 | Blonstein |
| 6,038,522 A | 3/2000 | Manson et al. |
| 6,061,062 A | 5/2000 | Venolia |
| 6,064,384 A | 5/2000 | Ho |
| 6,067,554 A | 5/2000 | Hohensee |
| 6,081,817 A | 6/2000 | Taguchi |
| 6,088,032 A | 7/2000 | Mackinlay |
| 6,100,887 A | 8/2000 | Bormann et al. |
| 6,108,657 A | 8/2000 | Shoup |
| 6,111,578 A | 8/2000 | Tesler |
| 6,119,120 A | 9/2000 | Miller |
| 6,149,519 A | 11/2000 | Osaki |
| 6,151,059 A | 11/2000 | Schein |
| 6,151,604 A | 11/2000 | Wlaschin |
| 6,151,702 A | 11/2000 | Overturf |
| 6,163,345 A | 12/2000 | Noguchi |
| 6,174,845 B1 | 1/2001 | Rattinger |
| 6,175,362 B1 | 1/2001 | Harms |
| 6,175,845 B1 | 1/2001 | Smith |
| 6,185,551 B1 | 2/2001 | Birrell |
| 6,188,406 B1 | 2/2001 | Fong |
| 6,189,012 B1 | 2/2001 | Mital |
| 6,202,068 B1 | 3/2001 | Kraay |
| 6,211,873 B1 | 4/2001 | Moyer |
| 6,236,994 B1 | 5/2001 | Swartz |
| 6,237,004 B1 | 5/2001 | Dodson |
| 6,240,421 B1 | 5/2001 | Stolarz |
| 6,243,093 B1 | 6/2001 | Czerwinski |
| 6,243,724 B1 | 6/2001 | Mander |
| 6,253,218 B1 | 6/2001 | Aoki |
| 6,262,722 B1 | 7/2001 | Allison |
| 6,266,059 B1 | 7/2001 | Matthews |
| 6,266,098 B1 | 7/2001 | Cove |
| 6,281,898 B1 | 8/2001 | Nikolovska |
| 6,281,940 B1 | 8/2001 | Sciammarella |
| 6,289,362 B1 | 9/2001 | Van Der Meer |
| 6,295,639 B1 | 9/2001 | Van Der Meer |
| 6,308,187 B1 | 10/2001 | Destefano |
| 6,310,622 B1 | 10/2001 | Asente |
| 6,313,851 B1 | 11/2001 | Matthews |
| 6,317,761 B1 | 11/2001 | Landsman et al. |
| 6,335,742 B1 | 1/2002 | Takemoto |
| 6,337,698 B1 | 1/2002 | Keely |
| 6,338,044 B1 | 1/2002 | Cook et al. |
| 6,344,880 B1 | 2/2002 | Takahashi |
| 6,351,765 B1 | 2/2002 | Pietropaolo |
| 6,353,831 B1 | 3/2002 | Gustman |
| 6,366,299 B1 | 4/2002 | Lanning |
| 6,381,362 B1 | 4/2002 | Desphande et al. |
| 6,388,665 B1 | 5/2002 | Linnett |
| 6,392,651 B1 | 5/2002 | Stradley |
| 6,418,556 B1 | 7/2002 | Bennington |
| 6,425,129 B1 | 7/2002 | Sciammarella |
| 6,434,545 B1 | 8/2002 | MacLeod et al. |
| 6,434,598 B1 | 8/2002 | Gish |
| 6,456,938 B1 | 9/2002 | Barnard |
| 6,457,006 B1 | 9/2002 | Gruenwald |
| 6,457,017 B2 | 9/2002 | Watkins |
| 6,463,431 B1 | 10/2002 | Schmitt |
| 6,466,237 B1 | 10/2002 | Miyao et al. |
| 6,487,557 B1 | 11/2002 | Nagatomo et al. |
| 6,491,585 B1 | 12/2002 | Miyamoto |
| 6,501,469 B1 | 12/2002 | MacPhail |
| 6,507,858 B1 | 1/2003 | Kanerva |
| 6,538,672 B1 | 3/2003 | Dobbelaar |
| 6,542,896 B1 | 4/2003 | Gruenwald |
| 6,553,310 B1 | 4/2003 | Lopke |
| 6,556,225 B1 | 4/2003 | MacPhail |
| 6,577,350 B1 | 6/2003 | Proehl |
| 6,581,068 B1 | 6/2003 | Bensoussan et al. |
| 6,587,106 B1 | 7/2003 | Suzuki et al. |
| 6,594,673 B1 | 7/2003 | Smith |
| 6,598,043 B1 | 7/2003 | Baclawski |
| 6,600,501 B1 | 7/2003 | Israel |
| D478,090 S | 8/2003 | Nguyen |
| 6,604,144 B1 | 8/2003 | Anders |
| 6,613,100 B2 | 9/2003 | Miller |
| 6,636,246 B1 | 10/2003 | Gallo |
| 6,638,313 B1 | 10/2003 | Freeman |
| 6,642,939 B1 | 11/2003 | Vallone |
| 6,650,343 B1 | 11/2003 | Fujita |
| 6,662,357 B1 | 12/2003 | Bowman-Amuah |
| 6,668,102 B2 | 12/2003 | Chiba |
| 6,671,692 B1 | 12/2003 | Marpe |
| 6,671,693 B1 | 12/2003 | Marpe |
| 6,671,694 B2 | 12/2003 | Baskins et al. |
| 6,675,158 B1 | 1/2004 | Rising |
| 6,678,671 B1 | 1/2004 | Petrovic |
| 6,678,694 B1 | 1/2004 | Zimmermann |
| 6,678,891 B1 | 1/2004 | Wilcox |
| 6,684,249 B1 | 1/2004 | Frerichs et al. |
| 6,690,391 B1 | 2/2004 | Proehl |
| 6,691,127 B1 | 2/2004 | Bauer |
| 6,694,326 B2 | 2/2004 | Mayhew |
| 6,694,335 B1 | 2/2004 | Hopmann |
| 6,694,486 B2 | 2/2004 | Frank |
| 6,701,318 B2 | 3/2004 | Fox |
| 6,704,727 B1 | 3/2004 | Kravets |
| 6,704,744 B1 | 3/2004 | Williamson |

(56) References Cited

U.S. PATENT DOCUMENTS

| | | |
|---|---|---|
| 6,721,760 B1 | 4/2004 | Ono et al. |
| 6,725,232 B2 | 4/2004 | Bradley |
| 6,725,427 B2 | 4/2004 | Freeman |
| 6,735,591 B2 | 5/2004 | Khan |
| 6,738,787 B2 | 5/2004 | Stead |
| 6,744,447 B2 | 6/2004 | Estrada et al. |
| 6,744,967 B2 | 6/2004 | Kaminski et al. |
| 6,754,660 B1 | 6/2004 | MacPhail |
| 6,768,999 B2 | 7/2004 | Prager |
| 6,772,148 B2 | 8/2004 | Baclawski |
| 6,859,803 B2 | 2/2005 | Dagtas |
| 6,862,027 B2 | 3/2005 | Andrews |
| 6,865,717 B2 | 3/2005 | Wright et al. |
| 6,879,946 B2 | 4/2005 | Rong |
| 6,889,220 B2 | 5/2005 | Wolff |
| 6,900,807 B1 | 5/2005 | Liongosari et al. |
| 6,901,558 B1 | 5/2005 | Andreas et al. |
| 6,915,254 B1 | 7/2005 | Heinze |
| 6,915,489 B2 | 7/2005 | Gargi |
| 6,922,699 B2 | 7/2005 | Schuetze |
| 6,925,611 B2 | 8/2005 | SanGiovanni |
| 6,927,770 B2 | 8/2005 | Ording et al. |
| 6,934,916 B1 | 8/2005 | Webb et al. |
| 6,948,124 B2 | 9/2005 | Combs |
| 6,961,900 B1 | 11/2005 | Sprague et al. |
| 6,965,380 B1 | 11/2005 | Kumata et al. |
| 6,973,628 B2 | 12/2005 | Asami |
| 6,983,227 B1 | 1/2006 | Thalhammer-Reyero et al. |
| 6,985,948 B2 | 1/2006 | Taguchi et al. |
| 6,987,220 B2 | 1/2006 | Holcombe |
| 7,007,034 B1 | 2/2006 | Hartman |
| 7,010,744 B1 | 3/2006 | Torgerson |
| 7,019,741 B2 | 3/2006 | Kelly et al. |
| 7,020,848 B2 | 3/2006 | Rosenzweig |
| 7,055,104 B1 | 5/2006 | Billmaier |
| 7,080,394 B2 | 7/2006 | Istvan |
| 7,088,859 B1 | 8/2006 | Yamaguchi |
| 7,107,531 B2 | 9/2006 | Billmaier |
| 7,107,532 B1 | 9/2006 | Billmaier |
| 7,113,975 B2 | 9/2006 | Nakayama |
| 7,117,199 B2 | 10/2006 | Frank |
| 7,137,067 B2 | 11/2006 | Yanase |
| 7,139,006 B2 | 11/2006 | Wittenburg |
| 7,149,983 B1 | 12/2006 | Robertson |
| 7,155,675 B2 | 12/2006 | Billmaier |
| 7,159,177 B2 | 1/2007 | Billmaier |
| 7,199,809 B1 | 4/2007 | Lacy |
| 7,234,114 B2 | 6/2007 | Kurtz |
| 7,266,768 B2 | 9/2007 | Ferlitsch |
| 7,289,981 B2 | 10/2007 | Chang |
| 7,290,698 B2 | 11/2007 | Poslinski et al. |
| 7,293,228 B1 | 11/2007 | Lessing et al. |
| 7,302,649 B2 | 11/2007 | Ohnishi |
| 7,318,196 B2 | 1/2008 | Crow et al. |
| 7,334,191 B1 | 2/2008 | Sivan |
| 7,346,600 B2 | 3/2008 | Nakao |
| 7,346,850 B2 | 3/2008 | Swartz |
| 7,350,157 B1 | 3/2008 | Billmaier |
| 7,353,461 B2 | 4/2008 | Davidsson |
| 7,366,994 B2 | 4/2008 | Loui |
| 7,380,260 B1 | 5/2008 | Billmaier |
| 7,418,674 B2 | 8/2008 | Robbins |
| 7,444,598 B2 | 10/2008 | Horvitz |
| 7,447,713 B1 | 11/2008 | Berkheimer |
| 7,448,950 B2 | 11/2008 | Matsumoto |
| 7,458,033 B2 | 11/2008 | Bacigalupi et al. |
| 7,502,819 B2 | 3/2009 | Alonso |
| D589,972 S | 4/2009 | Casagrande et al. |
| 7,594,246 B1 | 9/2009 | Billmaier |
| 7,606,819 B2 | 10/2009 | Audet |
| 7,607,104 B2 | 10/2009 | Maeda |
| 7,629,527 B2 | 12/2009 | Hiner |
| 7,650,569 B1 | 1/2010 | Allen |
| 7,661,075 B2 | 2/2010 | Lahdesmaki |
| 7,680,817 B2 | 3/2010 | Audet |
| 7,681,128 B2 | 3/2010 | Yamamoto |
| 7,681,149 B2 | 3/2010 | Lahdesmaki |
| D614,197 S | 4/2010 | Casagrande |
| 7,703,040 B2 | 4/2010 | Cutrell |
| 7,710,423 B2 | 5/2010 | Drucker et al. |
| 7,716,194 B2 | 5/2010 | Williams |
| 7,735,102 B1 | 6/2010 | Billmaier |
| 7,739,598 B2 | 6/2010 | Porter |
| 7,739,622 B2 | 6/2010 | DeLine |
| 7,757,253 B2 | 7/2010 | Rappaport |
| 7,761,471 B1 | 7/2010 | Lee |
| 7,765,184 B2 | 7/2010 | Makela |
| 7,765,195 B2 | 7/2010 | Miller |
| 7,770,117 B1 | 8/2010 | Uy |
| 7,788,247 B2 | 8/2010 | Wang |
| 7,788,592 B2 | 8/2010 | William |
| 7,792,328 B2 | 9/2010 | Albertson et al. |
| 7,818,378 B2 | 10/2010 | Buchheit et al. |
| 7,822,735 B2 | 10/2010 | Suda |
| 7,844,074 B2 | 11/2010 | Moskowitz et al. |
| 7,870,489 B2 | 1/2011 | Serita |
| 7,899,818 B2 | 3/2011 | Stonehocker |
| 7,902,741 B2 | 3/2011 | Iwanaga |
| 7,991,720 B2 | 8/2011 | Mander |
| 8,001,481 B2 | 8/2011 | Chakra et al. |
| 8,010,508 B2 | 8/2011 | Audet |
| 8,010,892 B2 | 8/2011 | Audet |
| 8,010,903 B2 | 8/2011 | Dieberger |
| 8,069,404 B2 | 11/2011 | Audet |
| 8,078,966 B2 | 12/2011 | Audet |
| 8,091,033 B2 | 1/2012 | von Sichart |
| 8,099,680 B1 | 1/2012 | Kolde |
| 8,136,030 B2 | 3/2012 | Audet |
| 8,151,185 B2 | 4/2012 | Audet |
| 2001/0025288 A1 | 9/2001 | Yanase |
| 2001/0034766 A1 | 10/2001 | Morimoto |
| 2001/0055017 A1 | 12/2001 | Ording |
| 2002/0033848 A1 | 3/2002 | Sciammarella et al. |
| 2002/0035563 A1 | 3/2002 | Suda |
| 2002/0056129 A1 | 5/2002 | Blackketter |
| 2002/0059215 A1 | 5/2002 | Kotani et al. |
| 2002/0070958 A1 | 6/2002 | Yeo |
| 2002/0078440 A1 | 6/2002 | Feinberg |
| 2002/0087530 A1 | 7/2002 | Smith |
| 2002/0096831 A1 | 7/2002 | Nakayama |
| 2002/0101458 A1 | 8/2002 | SanGiovanni |
| 2002/0152474 A1 | 10/2002 | Dudkiewicz |
| 2002/0180795 A1 | 12/2002 | Wright et al. |
| 2003/0001898 A1 | 1/2003 | Bernhardson |
| 2003/0001901 A1 | 1/2003 | Crinon et al. |
| 2003/0037051 A1 | 2/2003 | Gruenwald |
| 2003/0046693 A1 | 3/2003 | Billmaier |
| 2003/0046694 A1 | 3/2003 | Istvan |
| 2003/0046695 A1 | 3/2003 | Billmaier |
| 2003/0052900 A1 | 3/2003 | Card |
| 2003/0090524 A1 | 5/2003 | Segerberg |
| 2003/0093260 A1 | 5/2003 | Dagtas |
| 2003/0093792 A1 | 5/2003 | Labeeb |
| 2003/0120681 A1 | 6/2003 | Baclawski |
| 2003/0120737 A1 | 6/2003 | Lytle |
| 2003/0121055 A1 | 6/2003 | Kaminski et al. |
| 2003/0128228 A1 | 7/2003 | Crow et al. |
| 2003/0132971 A1 | 7/2003 | Billmaier |
| 2003/0149939 A1 | 8/2003 | Hubel |
| 2003/0163468 A1 | 8/2003 | Freeman |
| 2003/0167902 A1 | 9/2003 | Hiner |
| 2003/0190950 A1 | 10/2003 | Matsumoto |
| 2003/0237047 A1 | 12/2003 | Borson |
| 2004/0003398 A1 | 1/2004 | Donian et al. |
| 2004/0024738 A1 | 2/2004 | Yamane |
| 2004/0054968 A1 | 3/2004 | Savage |
| 2004/0064473 A1 | 4/2004 | Thomas |
| 2004/0090439 A1 | 5/2004 | Dillner |
| 2004/0111401 A1 | 6/2004 | Chang |
| 2004/0125143 A1 | 7/2004 | Deaton |
| 2004/0128277 A1 | 7/2004 | Mander |
| 2004/0128377 A1 | 7/2004 | Sadaghiany |
| 2004/0139143 A1 | 7/2004 | Canakapalli |
| 2004/0150657 A1 | 8/2004 | Wittenburg |

(56) References Cited

U.S. PATENT DOCUMENTS

| | | | |
|---|---|---|---|
| 2004/0233238 A1 | 11/2004 | Lahdesmaki | |
| 2004/0233239 A1* | 11/2004 | Lahdesmaki | 345/810 |
| 2004/0263519 A1 | 12/2004 | Andrews | |
| 2005/0060667 A1 | 3/2005 | Robbins | |
| 2005/0119936 A1 | 6/2005 | Buchanan et al. | |
| 2005/0138066 A1* | 6/2005 | Finke-Anlauff et al. | 707/104.1 |
| 2006/0013554 A1 | 1/2006 | Poslinski et al. | |
| 2006/0013555 A1 | 1/2006 | Poslinski et al. | |
| 2006/0013556 A1 | 1/2006 | Poslinski et al. | |
| 2006/0013557 A1 | 1/2006 | Poslinski et al. | |
| 2006/0020966 A1 | 1/2006 | Poslinski et al. | |
| 2006/0020971 A1 | 1/2006 | Poslinski et al. | |
| 2006/0045470 A1 | 3/2006 | Poslinski et al. | |
| 2006/0136466 A1 | 6/2006 | Weiner | |
| 2006/0156246 A1 | 7/2006 | Williams | |
| 2006/0209069 A1 | 9/2006 | Bacigalupi et al. | |
| 2006/0242178 A1 | 10/2006 | Butterfield | |
| 2006/0248129 A1 | 11/2006 | Carnes | |
| 2006/0259511 A1 | 11/2006 | Boerries | |
| 2007/0005576 A1 | 1/2007 | Cutrell | |
| 2007/0007884 A1 | 1/2007 | Iwanaga | |
| 2007/0061855 A1 | 3/2007 | Serita | |
| 2007/0067290 A1 | 3/2007 | Makela | |
| 2007/0083527 A1 | 4/2007 | Wadler et al. | |
| 2007/0143803 A1 | 6/2007 | Lim et al. | |
| 2007/0156654 A1 | 7/2007 | Ravinarayanan | |
| 2007/0168877 A1 | 7/2007 | Jain et al. | |
| 2007/0171224 A1 | 7/2007 | MacPherson | |
| 2007/0192749 A1* | 8/2007 | Baudisch | 715/863 |
| 2007/0204218 A1 | 8/2007 | Weber | |
| 2007/0214169 A1 | 9/2007 | Audet | |
| 2007/0216694 A1 | 9/2007 | Audet | |
| 2007/0220209 A1 | 9/2007 | Maeda et al. | |
| 2007/0239676 A1 | 10/2007 | Stonehocker | |
| 2007/0271508 A1 | 11/2007 | Audet | |
| 2008/0000126 A1 | 1/2008 | Teza | |
| 2008/0015911 A1* | 1/2008 | Wang et al. | 705/7 |
| 2008/0016142 A1 | 1/2008 | Schneider | |
| 2008/0019371 A1 | 1/2008 | Anschutz | |
| 2008/0022199 A1 | 1/2008 | Sako | |
| 2008/0058106 A1 | 3/2008 | Audet | |
| 2008/0071822 A1 | 3/2008 | Audet | |
| 2008/0072169 A1 | 3/2008 | Audet | |
| 2008/0092038 A1 | 4/2008 | Audet | |
| 2008/0098323 A1 | 4/2008 | Vallone et al. | |
| 2008/0104534 A1 | 5/2008 | Park et al. | |
| 2008/0118219 A1 | 5/2008 | Chang et al. | |
| 2008/0133579 A1 | 6/2008 | Lim | |
| 2008/0134013 A1 | 6/2008 | Audet | |
| 2008/0134022 A1 | 6/2008 | Audet | |
| 2008/0141115 A1 | 6/2008 | Audet | |
| 2008/0243778 A1 | 10/2008 | Behnen | |
| 2008/0244437 A1 | 10/2008 | Fischer et al. | |
| 2008/0256473 A1 | 10/2008 | Chakra et al. | |
| 2008/0256474 A1 | 10/2008 | Chakra et al. | |
| 2008/0270361 A1 | 10/2008 | Meyer | |
| 2008/0270928 A1 | 10/2008 | Chakra et al. | |
| 2008/0295016 A1 | 11/2008 | Audet | |
| 2008/0299989 A1 | 12/2008 | King | |
| 2008/0301562 A1* | 12/2008 | Berger et al. | 715/733 |
| 2008/0307348 A1 | 12/2008 | Jones et al. | |
| 2009/0019371 A1 | 1/2009 | Audet | |
| 2009/0048981 A1 | 2/2009 | Millan | |
| 2009/0055413 A1 | 2/2009 | Audet | |
| 2009/0055726 A1 | 2/2009 | Audet | |
| 2009/0055729 A1 | 2/2009 | Audet | |
| 2009/0055763 A1 | 2/2009 | Audet | |
| 2009/0055776 A1 | 2/2009 | Audet | |
| 2009/0063552 A1 | 3/2009 | Jones | |
| 2009/0064143 A1 | 3/2009 | Bhogal et al. | |
| 2009/0070662 A1 | 3/2009 | Audet | |
| 2009/0070699 A1 | 3/2009 | Birkill et al. | |
| 2009/0083260 A1 | 3/2009 | Artom | |
| 2009/0083859 A1 | 3/2009 | Roth et al. | |
| 2009/0106684 A1 | 4/2009 | Chakra et al. | |
| 2009/0106685 A1 | 4/2009 | Care et al. | |
| 2009/0113334 A1 | 4/2009 | Chakra et al. | |
| 2009/0116817 A1 | 5/2009 | Kim et al. | |
| 2009/0150832 A1 | 6/2009 | Keller et al. | |
| 2009/0164933 A1 | 6/2009 | Pederson et al. | |
| 2009/0199119 A1 | 8/2009 | Park et al. | |
| 2009/0228788 A1 | 9/2009 | Audet | |
| 2009/0235194 A1 | 9/2009 | Arndt et al. | |
| 2009/0254850 A1 | 10/2009 | Almeida | |
| 2009/0284658 A1 | 11/2009 | Cho | |
| 2009/0287693 A1 | 11/2009 | Audet | |
| 2009/0288006 A1 | 11/2009 | Audet | |
| 2009/0319933 A1 | 12/2009 | Zaika et al. | |
| 2010/0057576 A1 | 3/2010 | Brodersen et al. | |
| 2010/0082427 A1 | 4/2010 | Burgener | |
| 2010/0082653 A1 | 4/2010 | Nair | |
| 2010/0083159 A1 | 4/2010 | Mountain et al. | |
| 2010/0094890 A1 | 4/2010 | Bokor | |
| 2010/0145976 A1 | 6/2010 | Higgins | |
| 2010/0150522 A1 | 6/2010 | Schmehl et al. | |
| 2010/0169823 A1 | 7/2010 | Audet | |
| 2010/0171861 A1 | 7/2010 | Ota et al. | |
| 2010/0185509 A1 | 7/2010 | Higgins | |
| 2010/0313158 A1 | 12/2010 | Lee et al. | |
| 2010/0313159 A1 | 12/2010 | Decker et al. | |
| 2010/0318200 A1 | 12/2010 | Foslien et al. | |
| 2010/0325132 A1 | 12/2010 | Liu | |
| 2010/0325134 A1 | 12/2010 | Galfond | |
| 2010/0332512 A1 | 12/2010 | Shpits | |
| 2010/0333031 A1 | 12/2010 | Castelli | |
| 2011/0061082 A1 | 3/2011 | Heo et al. | |
| 2011/0078166 A1 | 3/2011 | Oliver | |
| 2011/0145745 A1 | 6/2011 | Hyeon et al. | |
| 2011/0154213 A1 | 6/2011 | Wheatley et al. | |
| 2011/0246926 A1 | 10/2011 | Newton | |
| 2011/0307814 A1 | 12/2011 | Audet | |
| 2012/0159320 A1 | 6/2012 | Audet | |
| 2012/0198385 A1 | 8/2012 | Audet | |
| 2012/0198389 A1 | 8/2012 | Audet | |
| 2012/0249581 A1 | 10/2012 | Cassistat | |
| 2012/0260204 A1 | 10/2012 | Audet | |
| 2012/0262398 A1* | 10/2012 | Kim et al. | 345/173 |
| 2013/0080880 A1 | 3/2013 | Cassistat | |
| 2013/0080888 A1 | 3/2013 | Audet | |

FOREIGN PATENT DOCUMENTS

| | | |
|---|---|---|
| JP | 08-016612 | 1/1996 |
| JP | 09-016809 | 1/1997 |
| JP | 09-265480 | 10/1997 |
| JP | 09-288659 | 11/1997 |
| JP | 10-143414 | 5/1998 |
| JP | 10-149432 | 6/1998 |
| JP | 10-275222 | 10/1998 |
| JP | 11-120180 | 4/1999 |
| JP | 11-195028 | 7/1999 |
| JP | 11-212988 | 8/1999 |
| JP | 2000-099540 | 4/2000 |
| JP | 2000-250942 | 9/2000 |
| JP | 2000-293281 | 10/2000 |
| JP | 2000-348040 | 12/2000 |
| JP | 2001-005822 | 1/2001 |
| JP | 2001-092737 | 4/2001 |
| JP | 2001-101227 | 4/2001 |
| JP | 2001-167288 | 6/2001 |
| JP | 2001-243244 | 9/2001 |
| JP | 2001-282816 | 10/2001 |
| JP | 2001-331514 | 11/2001 |
| JP | 2001-337762 | 12/2001 |
| JP | 2001-337953 | 12/2001 |
| JP | 2002-056411 | 2/2002 |
| WO | WO 00/65429 | 11/2000 |
| WO | WO 01/22194 | 3/2001 |
| WO | WO 01/63378 | 8/2001 |
| WO | WO 01/98881 | 12/2001 |
| WO | WO 03/001345 | 1/2003 |
| WO | WO 03/032199 | 4/2003 |
| WO | WO 2005/045756 | 5/2005 |

(56) References Cited

FOREIGN PATENT DOCUMENTS

| WO | WO 2005/083595 | 9/2005 |
|---|---|---|
| WO | WO 2007/095997 | 8/2007 |
| WO | WO 2008/030779 | 3/2008 |

OTHER PUBLICATIONS

Haystack Project; David R. Karger, Stephen J. Garland, Karun Bakshi, David Huynh, Nicholas Matsakis, Dennis Quan, Vineet Sinha, Jaime Teevan, Yuan Shen, Punyashloka Biswal, Artem Gleyzer, Ryan Manuel, Alexandre P. Poliakov, Amanda Smith, Lynn A. Stein, Eytan Adar, Mark Asdoorian, Robert Aspell, Wendy Chien, Gabriel Cunningham, Jonathan Derryberry, Adam Holt, Joshua Kramer, Percy Liang, Ilya Lisansky, Aidan Low, Enrique A. Muñoz Torres, Mark Rosen, Kai Shih, Svetlana Shnitser, Ben Walter, Marina Zhurakhinskaya; Massachsetts Institute of Technology; http://web.archive.org/web/20070415053620/http://haystack.lcs.mit.edu/ ; http://groups.csail.mit.edu/haystack/ ; http://en.wikipedia.org/wiki/Haystack_%28MIT_project%29.

Chandler Project; Grant Baillie, Jeffrey Harris, Sheila Mooney, Katie Capps Parlante, Jared Rhine, Mimi Yin, Eugene Kim, Alex Russell, Andre Mueninghoff, Al Cho, Aleks Totic, Alec Flett, Andi Vajda, Andy Hertzfeld, Aparna Kadakia, Bobby Rullo, Brendan O'Connor, Brian Douglas Skinner, Brian Kirsch, Brian Moseley, Bryan Stearns, Chao Lam, Chris Haumesser, David Surovell, Donn Denman, Ducky Sherwood, Ed Bindl, Edward Chao, Heikki Toivonen, Jed Burgess, John Anderson, John Townsend, Jürgen Botz, Lisa Dusseault, Lori Motko, Lou Montulli, Mark Jaffe, Matthew Eernisse, Michael Toy, Mike Taylor, Mitch Kapor, Morgen Sagen, Pieter Hartsook, Philippe Bossut, Priscilla Chung, Robin Dunn, Randy Letness, Rys McCusker, Stuart Parmenter, Suzette Tauber, Ted Leung, Travis Vachon, Vinubalaji Gopal ; Open Source Applications Foundation ; http://chandlerproject.org/.

Emacs Org-Mode; Carsten, Bastien Guerry, Eric Shulte, Dan Davison, John Wiegley, Sebastian Rose, Nicolas Goaziou, Achim Gratz, Nick Dokos, Russel Adams, Suvayu Ali, Luis Anaya, Thomas Baumann, Michael Brand, Christophe Bataillon, Alex Bochannek, Jan BÃ¶cker, Brad Bozarth, Tom Breton, Charles Cave, Pavel Chalmoviansky, Gregory Chernov, Sacha Chua, Toby S. Cubitt, Baoqiu Cui, Eddward DeVilla, Nick Dokos, Kees Dullemond, Thomas S. Dye, Christian Egli, David Emery, Nic Ferrier, Miguel A. Figueroa-Villanueva, John Foerch, Raimar Finken, Mikael Fornius, Austin Frank, Eric Fraga, Barry Gidden, Niels Giesen, Nicolas Goaziou, Kai Grossjohann, Brian Gough, Bernt Hansen, Manuel Hermenegildo, Phil Jackson, Scott Jaderholm, Matt Jones, Tokuya Kameshima, Jonathan Leech-Pepin, Shidai Liu, Matt Lundin, David Maus, Jason F. McBrayer, Max Mikhanosha, Dmitri Minaev, Stefan Monnier, Richard Moreland, Rick Moynihan, Todd Neal, Greg Newman, Tim O'Callaghan, Osamu Okano, Takeshi Okano, Oliver Oppitz, Scott Otterson, Pete Phillips, Francesco Pizzolante, Martin Pohlack, T.V. Raman, Matthias Rempe, Paul Rivier, Kevin Rogers, Frank Ruell, Jason Riedy, Philip Rooke, Christian Schlauer, Christopher Schmidt, Paul Sexton, Tom Shannon, Ilya Shlyakhter, Stathis Sideris, Daniel Sinder, Dale Smith, James TD Smith, Adam Spiers, Ulf Stegemann, Andy Stewart, David O'Toole, Jambunathan K, Sebastien Vauban, Stefan Vollmar, Jürgen Vollmer, Samuel Wales, Chris Wallace, David Wainberg, Carsten Wimmer, Roland Winkler, Piotr Zielinski; http://orgmode.org/.

* cited by examiner

METHOD OF ASSOCIATING ATTRIBUTES WITH DOCUMENTS

CROSS-REFERENCES

The present invention relates to, claims priority from and is a continuation application of U.S. patent application Ser. No. 12/559,128, filed Sep. 14, 2009, entitled METHOD OF MANAGING GROUPS OF ARRAYS OF DOCUMENTS, which claims priority from U.S. Provisional patent application No. 61/096,655, filed on Sep. 12, 2008, entitled INFORMATION MANAGEMENT TOOL, which documents are incorporated herein by reference.

FIELD OF THE INVENTION

This invention relates generally to computer systems and more specifically to a method, a system and an interface that facilitates localization and organization of user-selectable elements. More precisely, the present invention relates to a method of associating attributes with documents in an axes-based content management system.

BACKGROUND OF THE INVENTION

With the always-increasing amount of documents one has to deal with on a daily basis it becomes harder to manage the documents (or information or file) on an item-by-item basis. An alternative document management system adapted to organize large amount of information would be beneficial to the user.

United States Patent Application Publication No.: US 2007/0214169 A1, published on Sep. 13, 2007 discloses a Multi-dimensional locating system and method (title). The patent application discloses ways for managing and displaying axes of documents and other computer-readable files. An axis of documents that groups a plurality of documents along a predetermined order, inter alia, is taught.

However, the use of only a small number of axes of information elements on a display might result in a poor use of the usable display area. A larger number of axes might be desirable to provide more information to a viewer. A number of challenges need to be addressed in order to provide functions performed on a larger quantity of documents.

In view of the prior art it appears that improvements over the prior art is desirable to improve the user experience and usability either with innovative graphical, structural or functional improvements.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

This invention generally refers to user-selectable elements that might represent computer-readable files like documents and multimedia assets. User-selectable elements can alternatively be referred to as menu icons or thumbnails that are associated to an attribute, a category or a tag and arranged as explained below. In order to lighten the reading of the present specification, the term "document" is generally used without intending to limit the scope of the present patent application only to documents, unless positively specified.

Also, the invention is generally described using an assembly of documents called an array of documents. The array of documents generally refers to, but is not limited to, a substantially longitudinal arrangement of documents. Hereinbelow referred to as an axis. The axis might not necessarily be straight but preferably has a consistent shape providing a viewer en indication of continuity therebetween documents disposed thereon. In other words, the array of documents can be defined by a single axis or a double axis of documents (or more adjacent rows or columns or documents) and the axis can be completely straight, slightly curved, substantially curved, angled, following a particular shape or having a consistent shape over which documents are disposed in a reasonably consistent fashion adapted to allow a viewer to infer a comprehensive suite of documents.

Array of Documents Magnifier

An object of the present invention provides a method to magnify documents from an array of documents.

Another object of the present invention provides a magnifier adapted to magnify a portion of an array of documents.

One aspect of the present invention provides a method to magnify a document on an array of documents that is adapted to graphically link the document with a related non-magnified document.

One other aspect of the present invention provides a method of magnifying a document that is triggered by a "mouse over" (or hovered with a user-managed pointer or with a human body part contacting a touch-screen) on a portion of an array of documents.

Another aspect of the present invention provides a magnified document displaying attributes associated therewith. The attributes associated therewith being adapted to be selected when the document is magnified.

One additional aspect of the present invention provides a magnifier adapted to magnify selected documents and a hovering magnifier adapted to magnify hovered documents.

An aspect of the present invention provides a method to magnify a document that is configured to display information related to the magnified document, the quantity of information that is displayed being determined, at least in part, by the size of the document in its magnified state.

One other aspect of the present invention provides a method of magnifying a document that provides with the magnified documents functions to create an axis of documents having a commonality with the magnified document. The created axis being adapted to be displayed at a predetermined angle on a display.

Another aspect of the present invention provides a method of magnifying a portion of an axis of documents to magnify at least a portion of one document thereon and also provide to a user a choice of functions to create an additional axis based, at least in part, on a selection of attributes associated with the magnified document.

One additional aspect of the present invention provides a method of magnifying a document from an axis of documents and to provide at least one function associated with the magnified document.

Group(s) of Arrays

An object of the present invention provides a mechanism to assemble a plurality of arrays of document. The assembled plurality of arrays of documents being adapted to be described as a group of arrays of documents.

Another object of the present invention provides a graphical user interface adapted to assemble at least two arrays of documents along the same time line.

One object of the present invention provides a method and a graphical user interface providing same adapted to merge two axes of documents having respective timelines in a group of axes sharing the same timeline.

Another one object of the present invention provides a method and a graphical user interface adapted to drag an axis of documents and drop it next to another axis of documents to use a single timeline for both axes of documents.

One object of the present invention provides the creation of a group of array of documents.

One other object of the present invention provides the separation of a group of array of documents.

An aspect of the present invention provides a visual distinctive discriminator between arrays of documents. The visual distinctive discriminator might be a color adapted to distinguish two arrays of documents forming a group of arrays of documents.

Another aspect of the present invention provides a visual distinctive discriminator adapted to separate or visually discriminate two groups of arrays of documents.

One other aspect of the present invention provides distinct navigation capabilities for each group of arrays of documents. The navigation might be performed on a longitudinal direction when the group of arrays of documents has a longitudinal document distribution thereof.

Another aspect of the present invention provides a distinct navigation capability for arrays of documents in the same group of arrays of documents. The navigation might be performed on a longitudinal direction when arrays of documents have a longitudinal document distribution thereof.

One other aspect of the present invention provides distinct magnifying capabilities for each group of arrays of documents. Magnification of a group of arrays of documents does not influence the size of another group of array of documents displayed nearby.

Another aspect of the present invention provides distinct magnifying capabilities for each array of documents. Magnification of an array of documents does not influence the size of another array of documents displayed nearby.

An aspect of the present invention provides distinct navigational capabilities for each axis of documents within a group of axis of documents.

An aspect of the present invention provides distinct magnifying capabilities for each axis of documents within a group of axis of documents.

Another aspect of the present invention provides distinct timescales for each array of documents within a group of arrays of documents.

Another aspect of the present invention provides distinct timescales for each array of documents within a group of arrays of documents.

An aspect of the present invention provides a mechanism adapted to position a group of arrays of document among existing groups of arrays of documents.

An aspect of the present invention provides a mechanism adapted to locate an array of documents within a group of existing arrays of documents.

One aspect of the present invention provides groups of arrays of documents that are adapted to be reordered therebetween.

One aspect of the present invention provides arrays of documents within a group of arrays of documents that are adapted to be reordered.

Another aspect of the present invention provides at least one tangible machine-readable medium comprising machine-executable instructions adapted to be executable by the machine, the machine-executable instructions providing a method providing a first plurality of documents in a first array of documents; providing a second plurality of documents in a second array of documents; grouping the first array of documents and the second array of documents in a first group of arrays of documents; and displaying the first group of documents.

One other aspect of the present invention provides a graphical user interface comprising a mechanism configured to provide a first array of documents disposed in a substantially longitudinal fashion; a mechanism configured to provide a second array of documents disposed in a substantially longitudinal fashion; and a mechanism configured to group and display the first and second arrays of documents on a display.

Another aspect of the present invention provides a computer system comprising a documents gathering module adapted to provide a mechanism configured to provide a first array of documents disposed in a substantially longitudinal fashion and a mechanism configured to provide a second array of documents disposed in a substantially longitudinal fashion; and an array management module adapted to provide a mechanism configured to group and display the first and second arrays of documents on a display.

Arrays of Documents

One object of the present invention provides parallel axes of documents that can be reordered therebetween on a graphical user interface by selecting and dragging an axis of documents to a desired position.

Another aspect of the present invention provides axes of documents that are adapted to be independently longitudinally moveable and independently magnifyable.

An aspect of the present invention provides at least one tangible machine-readable medium comprising machine-executable instructions adapted to be executable by the machine, the machine-executable instructions providing a method comprising displaying a first plurality of documents in a first array of documents; selecting a document from the first array of documents; and magnifying attributes related to the selected document.

Another aspect of the present invention provides a method of presenting a search query, the method comprising displaying at least a portion of the search query on an array of documents comprising search results.

Yet another aspect of the present invention provides at least one tangible machine-readable medium comprising machine-executable instructions adapted to be executable by the machine, the machine-executable instructions providing a method comprising providing a first plurality of documents in a first array of documents; providing a second plurality of documents in a second array of documents; saving the first and the second array of documents in a workspace; and displaying the workspace on a display.

One other aspect of the present invention provides at least one tangible machine-readable medium comprising machine-executable instructions adapted to be executable by the machine, the machine-executable instructions providing a method comprising associating a document position offset with a first attribute; displaying a first plurality of documents in a first array of documents, each document being associated with at least one attribute; providing an array border; and offsetting the documents from the first array of documents having the first attribute associated therewith in a fashion adapted to discontinue the border.

Another aspect of the present invention provides at least one tangible machine-readable medium comprising machine-executable instructions adapted to be executable by the machine, the machine-executable instructions providing a method comprising displaying a first plurality of documents in a first axis of documents, each document being associated with at least one attribute and being imageless represented as a geometric shape having a width of some pixels on a display.

One aspect of the present invention provides an axis identification on an axis. The axis identification might be alternatively displayed thereon provided an action performed by a user. The axis identification might be given by the user or automatically generated. The axis identification could for instance comprise a sequential number and information about the query used to select the documents displayed on the axis.

Map of Arrays of Documents Landscape

One aspect of the present invention provides a map of arrays of documents landscape.

One other aspect of the present invention provides a map of arrays of documents landscape that discriminates the portion of the map that is visible on a display.

Another aspect of the present invention provides a means to discriminate the portion of the map that represents what is visible on a display; the visible portion being is adapted to be moved and to change what is visible on a display.

Yet another aspect of the present invention provides a map of arrays of documents landscape that discriminates the portion of the map that is visible on a display, the size of the map being a multiple of the size of the discriminated portion of the map that is visible on the display.

Yet another aspect of the present invention provides a map of arrays of documents landscape that discriminates the portion of the map that is visible on a display, the size of the map being a odd multiple of the size of the discriminated portion of the map that is visible on the display.

One aspect of the present invention provides a map of arrays of documents landscape that has a size smaller than the size of the entire landscape to prevent displaying a map with a scale adapted to see the arrays of documents on the landscape with sufficient details.

Another aspect of the present invention provides a map that is adapted to be dragged to illustrate a different portion of the landscape of arrays of documents.

One other aspect of the present invention provides a map of a landscape of arrays of documents that is adapted to display visual distinctive features respectively associated with the arrays of documents.

End of Array of Documents Identification

An aspect of the present invention provides a truncated array of documents.

One other aspect of the present invention provides an end of array of documents distinctive visual feature.

Another aspect of the present invention provides an end of array of documents identification that is a geometrical shape.

Another aspect of the present invention provides an end of array of documents identification that colored.

One other aspect of the present invention provides an end of array of documents that also ends a discriminating color of the array of documents.

Another aspect of the present invention provides an end of array of documents that is visible on a mini-map.

Array of E-Mail Documents

An aspect of the present invention provides an array of document adapted to display e-mails.

An aspect of the present invention provides a plurality of arrays of documents adapted to display e-mails associated with a plurality of e-mail addresses.

One other aspect of the present invention provides a plurality of arrays of documents adapted to display e-mail documents separated in an inbox-array of e-mail documents and a sent-array of e-mail documents.

Another aspect of the present invention provides a firewall separating the e-mails displayed on an array of e-mails and the database of the documents displayed on another array of documents.

Another aspect of the present invention provides an array of e-mails that is displayed among other arrays of documents while the e-mails are not inserted as documents in the document management system database.

One other aspect of the present invention provides an insertion of an e-mail document in a document database by dragging the subject email from the e-mail array to another array of documents.

Another aspect of the present invention provides a mechanism that automatically retrieves emails from a server and graphically displays the retrieved e-mails on an array of e-mail documents.

One another aspect of the present invention provides an array of e-mail documents that can be moved and placed between other arrays of documents.

Yet another aspect of the present invention provides an insertion of an e-mail document by associating an attribute with the e-mail.

Another aspect of the present invention provides a first database adapted to store e-mails and a second database adapted to store documents in order to prevent contamination of the second database by corrupted e-mails, both databases being adapted to respectively display an array of e-mails and an array of documents.

Yet another aspect of the present invention provides a first database adapted to store e-mails and a second database adapted to store documents in order to prevent contamination of the second database by corrupted e-mails, e-mails in the first database being inserted in the second database by the association of an attribute.

One other aspect of the present invention provides a first database adapted to store e-mails and a second database adapted to store documents in order to prevent contamination of the second database by corrupted e-mails, e-mails in the first database being inserted in the second database by dragging the e-mail from an e-mail array to another array of documents.

Trash Can Array

An aspect of the present invention provides a display of documents that have been put in a trash can on a trash can array of documents.

Another aspect of the present invention provides a mechanism to insert a document in the trash can by dragging the document from an array of documents to the trash can array of documents.

Another aspect of the present invention provides a removal of a document from the trash can by dragging the trashed document from the trash can array to another array of documents.

Drag and Drop Association of Attributes

One aspect of the present invention provides the ability to associate an attribute with a document by dragging the document on an array of document already having the attribute associated therewith.

An aspect of the present invention provides a method to associate attributes with a document by dragging a document to an array of documents having the attribute associated therewith.

Another aspect of the present invention provides a method to associate attributes with a document by dragging a document from a first an array of documents to a second array of documents having the attribute associated therewith.

Other advantages might become apparent to the skilled reader of this patent specification in light of the appended drawings.

DESCRIPTION OF EMBODIMENT(S) OF THE INVENTION

Figure 1:
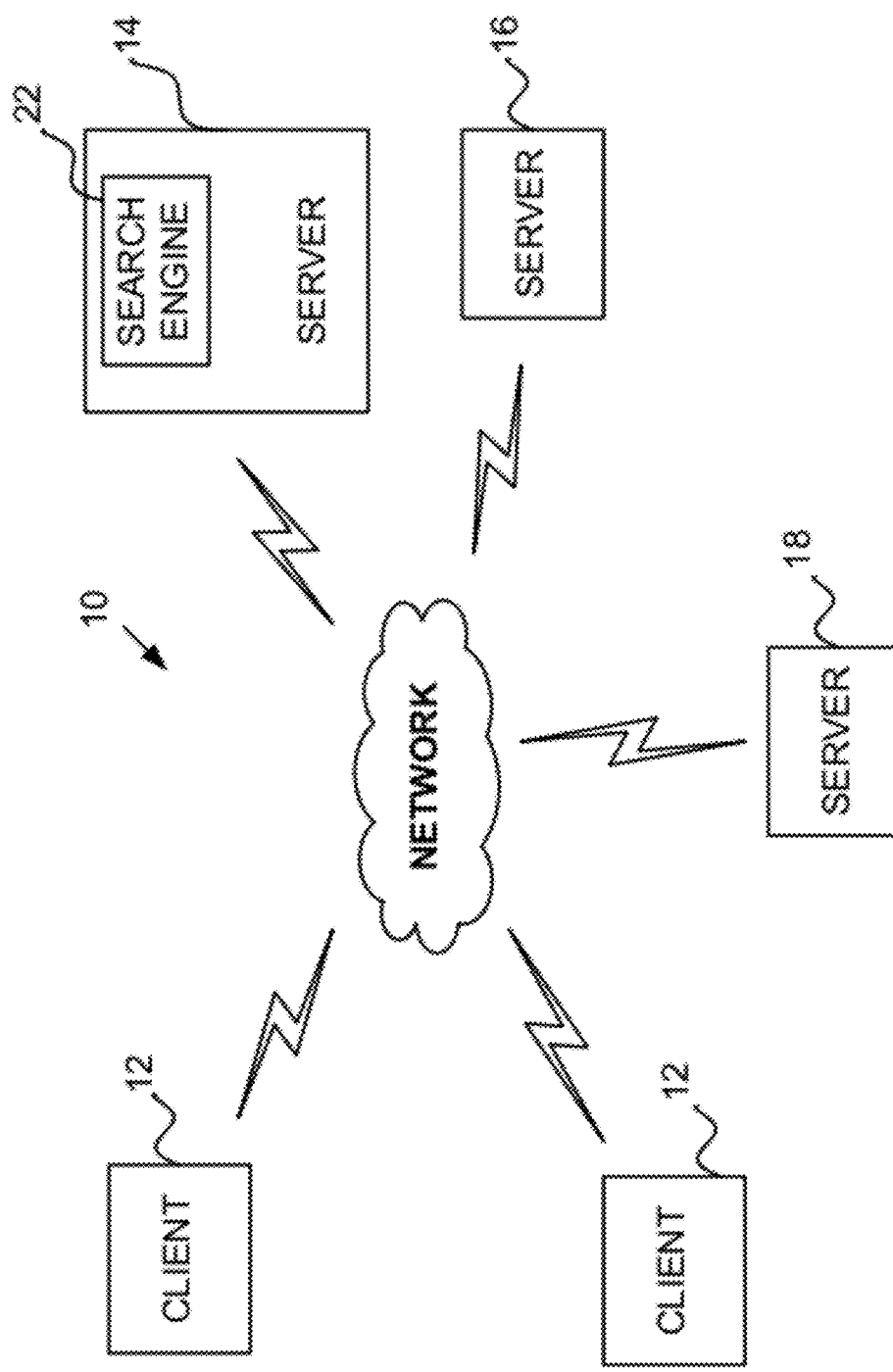
FIG. 1 is a schematic illustration of an exemplary computerized network.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The description is separated with subtitles to facilitate its readability. The subtitles include descriptions of portions of invention that might be interrelated despite they might appear under different subtitles. In other words, subtitles are not intended to separate part of the same invention or different inventions described therein but are rather intended to structure the text.

The features provided in this specification mainly relates to basic principles for managing arrays of documents. These code/instructions are preferably stored on a machine-readable medium adapted to be read and acted upon to with a computer or a machine having corresponding code/instructions reading capability.

Exemplary Network

FIG. 1 illustrates an exemplary network 10 in which a system and method, consistent with the present invention, may be implemented. The network 10 may include multiple client devices 12 connected to multiple servers 14, 16, 18 via a network 20. The network 20 may include a local area network (LAN), a wide area network (WAN), a telephone network, such as the Public Switched Telephone Network (PSTN), an intranet, the Internet, Wi-Fi, WiMAX or a combination of networks. Two client devices 12 and three servers 14, 16, 18 have been illustrated as connected to network 20 for simplicity. In practice, there may be more or less client devices and servers. Also, in some instances, a client device may perform the functions of a server and a server may perform the functions of a client device.

The client devices 12 may include devices, such as mainframes, minicomputers, personal computers, laptops, personal digital assistants, telephones, or the like, capable of connecting to the network 20. The client devices 12 may transmit data over the network 20 or receive data from the network 20 via a wired, wireless, or optical connection.

The servers 14, 16, 18 may include one or more types of computer systems, such as a mainframe, minicomputer, or personal computer, capable of connecting to the network 20 to enable servers 14, 16, 18 to communicate with the client devices 12. In alternative implementations, the servers 14, 16, 18 may include mechanisms for directly connecting to one or more client devices 12. The servers 14, 16, 18 may transmit data over network 14 or receive data from the network 20 via a wired, wireless, or optical connection.

In an implementation consistent with the present invention, the server 14 may include a search engine 22 usable by the client devices 12. The servers 14 may store documents, such as web pages, accessible by the client devices 12.

Figure 2:
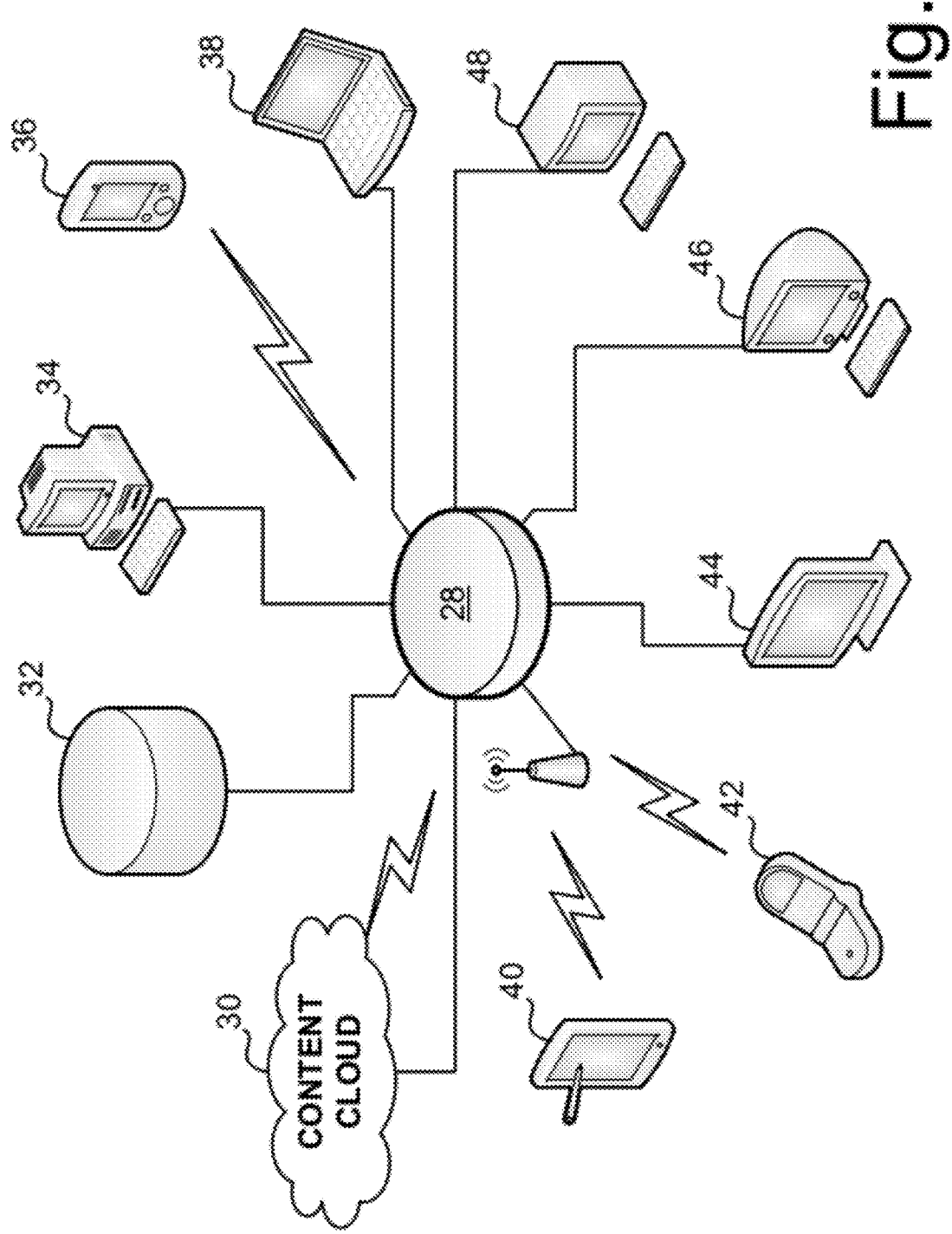
FIG. 2 is a schematic illustration of an exemplary multi-devices network layout.

With reference to FIG. 2, a network 20 includes the content cloud 30, a content database 32, content devices 34-38, and devices 40-48. The network mediator 28 enables the network devices 32-38 to communicate with each other without preconfiguring each device.

The content cloud 30 represent a content source such as the Internet, where content exists at various locations across the globe. The content includes multimedia content such as audio and video. The mediator 28 allows the content cloud to provide content to devices 40-48.

The content database 32 is a storage device that maintains content. The content database 32 may be a stand-alone device on an external communication network. The mediator 28 communicates with the content database 32 to access and retrieve content.

The content devices 34-38 include intelligent devices, such as, for example, personal computers, laptops, cell phones and personal digital assistants. The content devices 32-38 are capable or storing content information.

The devices 40-48 are intelligent devices that receive content from a content source 30-38. However, the devices 30-38 can also operate as servers to distribute content to other client devices.

Exemplary Client Architecture

Figure 3:
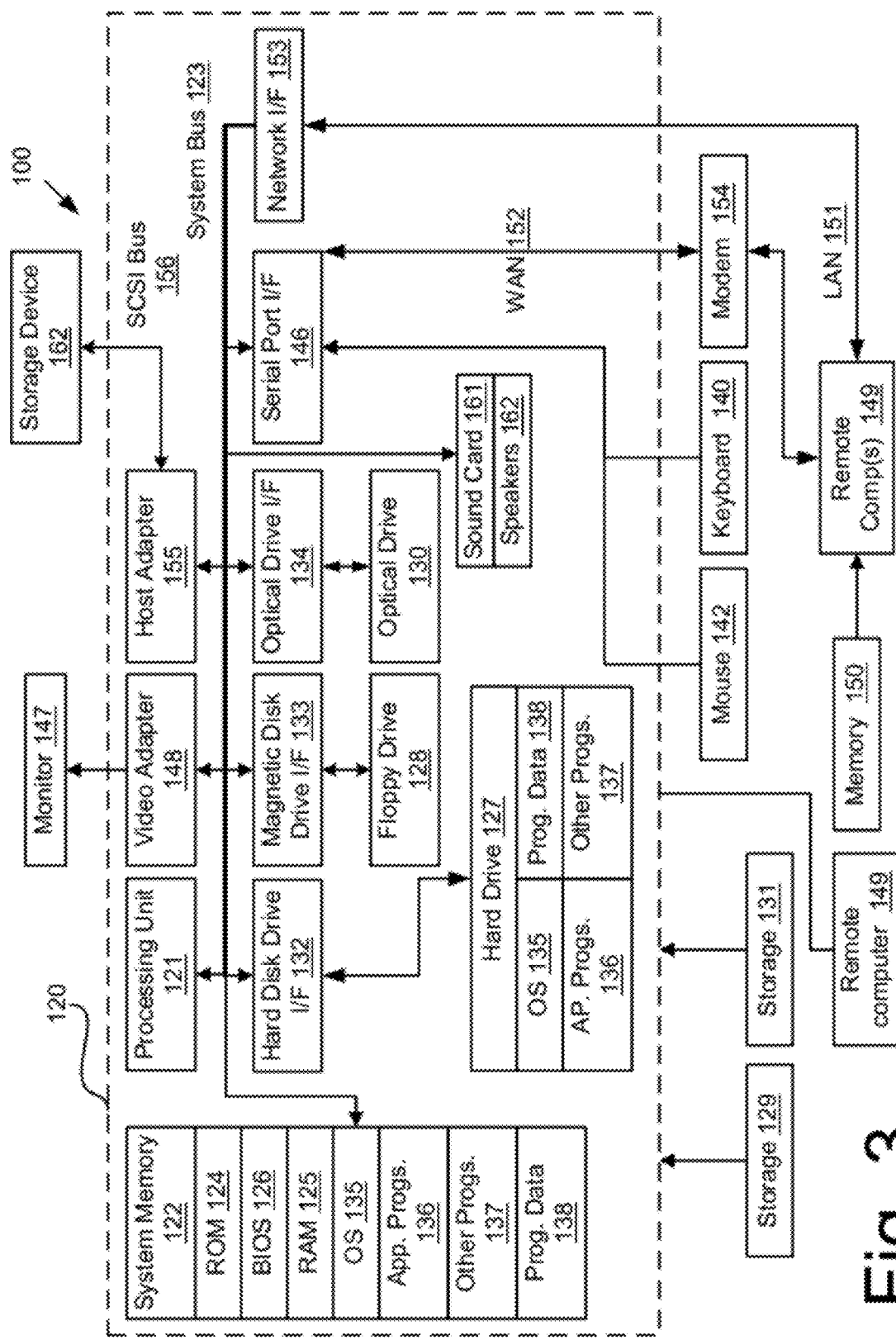
FIG. 3 is a schematic illustration of a typical exemplary computerized system.

FIG. 3 and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, applets, WEB 2.0 type of evolved networked centered applications, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, gaming console and the like. At least some aspects of the present invention may also be practiced in distributed computing environments where tasks are performed by remote processing devices linked through a communications network. In a distributed computing environment, program modules may be located in local and/or remote memory storage devices.

Now, with reference to FIG. 3, an exemplary apparatus 100 for implementing at least some aspects of the present invention includes a general purpose computing device in the form of a conventional personal computer 120. The personal computer 120 may include a processing unit 121, a system memory 122, and a system bus 123 that couples various system components, including the system memory 122, to the processing unit 121. The system bus 123 may be any of several types of bus structures including a memory bus or memory controller, a peripheral bus, and a local bus using any of a variety of bus architectures. The system memory may include read only memory (ROM) 124 and/or random access memory (RAM) 125. A basic input/output system 126 (BIOS), containing basic routines that help to transfer information between elements within the personal computer 120, such as during start-up, may be stored in ROM 124. The personal computer 120 may also include a hard disk drive 127 for reading from and writing to a hard disk, (not shown), a magnetic disk drive 128 for reading from or writing to a (e.g., removable) magnetic disk 129, and an optical disk drive 130 for reading from or writing to a removable (magneto) optical disk 131 such as a compact disk or other (magneto) optical media. The hard disk drive 127, magnetic disk drive 128, and (magneto) optical disk drive 130 may be coupled with the system bus 123 by a hard disk drive interface 132, a magnetic disk drive interface 133, and a (magneto) optical drive interface 134, respectively. The drives and their associated storage media provide nonvolatile (or persistent) storage of machine-readable instructions, data structures, program modules and other data for the personal computer 120. Although the exemplary environment described herein employs a hard disk, a removable magnetic disk 129 and a removable optical disk 131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 127, magnetic disk 129, (magneto) optical disk 131, ROM 124 or RAM 125, such as an operating system 135 (for example, Windows® NT™ 4.0, sold by Microsoft® Corporation of Redmond, Wash.), one or more application programs 136, other program modules 137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 138 for example.

A user may enter commands and information into the personal computer 120 through input devices, such as a keyboard 140, a camera 141 and pointing device 142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 121 through a serial port interface 146 coupled to the system bus. However, input devices may be connected by other interfaces, such as a parallel port, a game port, blue tooth connection or a universal serial bus (USB). For example, since the bandwidth of the camera 141 may be too great for the serial port, the video camera 141 may be coupled with the system bus 123 via a video capture card (not shown). The video monitor 147 or other type of display device may also be connected to the system bus 123 via an interface, such as a video adapter 148 for example. The video adapter 148 may include a graphics accelerator. One or more speaker 162 may be connected to the system bus 123 via a sound card 161 (e.g., a wave table synthesizer such as product number AWE64 Gold Card from Creative® Labs of Milpitas, Calif.). In addition to the monitor 147 and speaker(s) 162, the personal computer 120 may include other peripheral output devices (not shown), such as a printer for example. As an alternative or an addition to the video monitor 147, a stereo video output device, such as a head mounted display or LCD shutter glasses for example, could be used.

The personal computer 120 may operate in a networked environment that defines logical connections to one or more remote computers, such as a remote computer 149. The remote computer 149 may be another personal computer, a server, a router, a network PC, a peer device or other common network node, and may include many or all of the elements described above relative to the personal computer 120, although only a memory storage device has been illustrated in FIG. 1. The logical connections depicted in FIG. 2 include a local area network (LAN) 14 and a wide area network (WAN) 152, an intranet and the Internet.

When used in a LAN, the personal computer 120 may be connected to the LAN 14 through a network interface adapter (or "NIC") 153. When used in a WAN, such as the Internet, the personal computer 120 may include a modem 154 or other means for establishing communications over the wide area network 152 (e.g. Wi-Fi, WiMax . . . ). The modem 154, which may be internal or external, may be connected to the system bus 123 via the serial port interface 146. In a networked environment, at least some of the program modules depicted relative to the personal computer 120 may be stored in the remote memory storage device. The network connections shown are exemplary and other means of establishing a communications link between the computers may be used.

The Interface

An interface program providing an interface for managing documents in accordance with an embodiment of the invention is installed on a machine e.g. a computer system. The interface can be programmed using various programming languages e.g. C++, Java or other suitable programming languages. Programming of these languages is well known in the art and is adapted to be readable to provide executable instructions to a hardware system and will not be further described therein. The interface might run through the operating system and the hardware of the computer system or, alternatively, through a network based system e.g. client-server, and/cloud computing system. The interface is adapted to manage documents, computer files, pictures, multimedia content, applications (i.e. computer programs), menu elements and other user-selectable elements in a comprehensive fashion.

Documents are stored on a machine-readable medium and can be retrieved when needed with the interface program. Documents are disposed in an array layout providing a visually comprehensive display arrangement of the documents. The array can, illustratively, among other possibilities, be based on a selection of attribute(s), tag(s), category(ies), owner of documents, a chronological order, a statistical order or an order representing an increasing file size. Combinations of the above-listed possible choices, inter alia, are possible if desired to build a query adapted to reduce the number of documents to be displayed on the array. The array thus helps the viewer to infer additional meaning from the consistent display and distribution of the documents thereon.

An array is adapted to accommodate a single type of documents or, if desired, more than one type of documents, or a mix of documents, computer files, multimedia contents and/or user-selectable menu elements. Documents might overlap to squeeze more documents on the space available on the display. Magnification of selected documents on an array can be made to increase the level of details of the selected documents.

Using an array of documents helps to meaningfully and intuitively display a group of documents. An array of documents can be embodied as being a substantially linear distribution of documents adapted to dispose each document to be displayed on a line or on a curved line. The exact shape of the array is secondary, what matters, inter alia, is that the layout structure of an array provides a comprehensive suite of documents from which a viewer can infer an order, a sequence or a relationship between documents. The display of the array of documents might be made in accordance with a predetermined order (e.g. chronologically), or not. A linear distribution of documents can sort documents on a timeline. Another illustrative embodiment is a group of juxtaposed linear distribution of documents grouped together to form an array referring to a matrix of documents. A curved or a circular array of documents is also contemplated to be within the scope of the present disclosure.

The display of documents on an array of documents allows to contextually manage documents as a flow, or an ongoing suite, of documents instead of dealing with each document independently. By getting away from managing each document independently it becomes possible to efficiently deal with a significantly higher number of documents and still keep the documents in a structured order.

Each array of documents groups documents in accordance with, for example, a selected tag, a category, keywords, or an attribute that is commonly shared among the documents displayed on the array of documents. The term "attribute" will consistently be used throughout the instant specification to lighten the reading of the text and will include the other commonality between documents described therein unless otherwise specified. The selection of one or more attribute (using Boolean logic for instant) determines which documents will be displayed on the array of documents. If no specific attribute is selected, then, the array of documents displays all documents. Thus, all documents on the same array of documents are normally associated with the selected set or combination of attributes (trivial data, like publicity or specific related information, could be added to an array as long as the result remains a presentation of documents resulting from a query without departing from the scope of the present invention). In addition a timeline can be used to determine the order of the suite of documents on the array of documents. Chronological ordering is a very intuitive ordering to humans and is one of the preferred ways to present documents on an array of documents. In the case of a matrix of documents, then, one axis (e.g. horizontal direction) of the matrix can represent a timeline while the other axis (e.g. vertical direction) represents another criterion like, for example, the type of computer files each document relates to.

The attributes of a document can be selected to create another array of documents. The attribute of a document from the newly created array of documents can be selected to create an additional array of documents and so on so forth. This is what could be called "relational navigation" and is well described in the United States patent application publication referred to at the beginning of the present patent specification. The user can "navigate" along arrays of documents in accordance with their categorization to visualize the documents. Navigation tools are provided with the interface to allow navigation through various arrays of documents, when a plurality of arrays is enabled, and through the documents of a single array of documents. In the context of the present invention, a single suite of documents forming an axis along a timeline is one of the preferred embodiments because it is easy to sequentially navigate throughout the documents disposed along the axis.

When only a portion of the array is visible, a play of zoom, pan and movements along the array allows a viewer to navigate on the axis and change the document(s) that is(are)

displayed on the display. A small display area could display only one document from the array of documents while the remaining documents from the array of documents are not displayed but remain nonetheless at their "virtual" position on the array and ready to be displayed if the array is scrolled to show other documents. In other words, if we consider a mobile platform like a mobile phone having a small display, the small display area might allow to efficiently display only one document at the time. However, the displayed document being part of an array of documents, the other documents on the array of documents remain displayable in accordance with their respective position on the array of documents when the array is scrolled/navigated.

Figure 4:
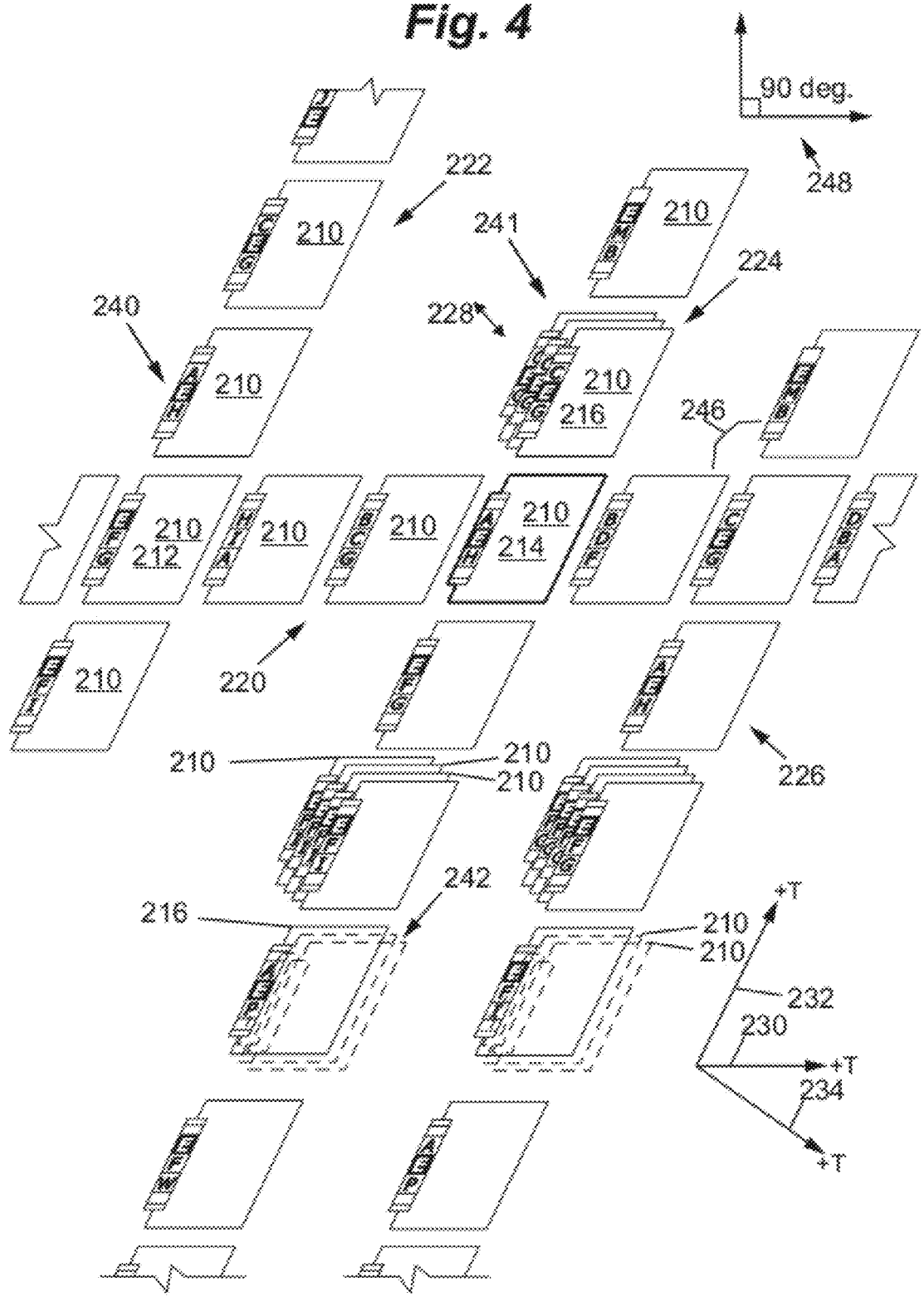
FIG. 4 is a schematic illustration of a multi-array layout wherein the arrays are longitudinal arrangements of documents in accordance with an embodiment of the present invention.

Referring now to FIG. 4, it is possible to appreciate a plurality of documents 210 disposed on various arrays of documents 220, 222, 224, 226 illustratively intersecting each other. Horizontal array of documents 220 disposed documents along a timeline 230 in the present embodiment. Each document 210 is juxtaposed with its associated set of attributes 240 represented here by capital letters where each letter represents an attribute. Array of documents 222 is a subset of array of documents 220 that displays documents having the attribute "E" in common along timeline 232. Document 212 is the intersection document between both arrays of documents 220, 222. Array of documents 224 is also grouping documents from the array of documents 220 having the attribute "E" in common. Document 214 is the intersecting document between array 224 and 220. Various versions 241 of document 216 are disposed on another array of documents 228 disposing documents along timeline 234. Future versions of a document 242 can also be shown in the future, in accordance with timeline 234, on top of the document 216 located on array of document 224. In the illustrative embodiment of FIG. 4 arrays of documents 222, 224, 226 are disposed at a slight angle 246 from their intersecting array of documents 220. In contrast, arrays of documents 222, 224, 226 could alternatively be orthogonally 248 disposed in respect from their intersecting array of documents 220.

Array of Documents Magnifier

Figure 5:
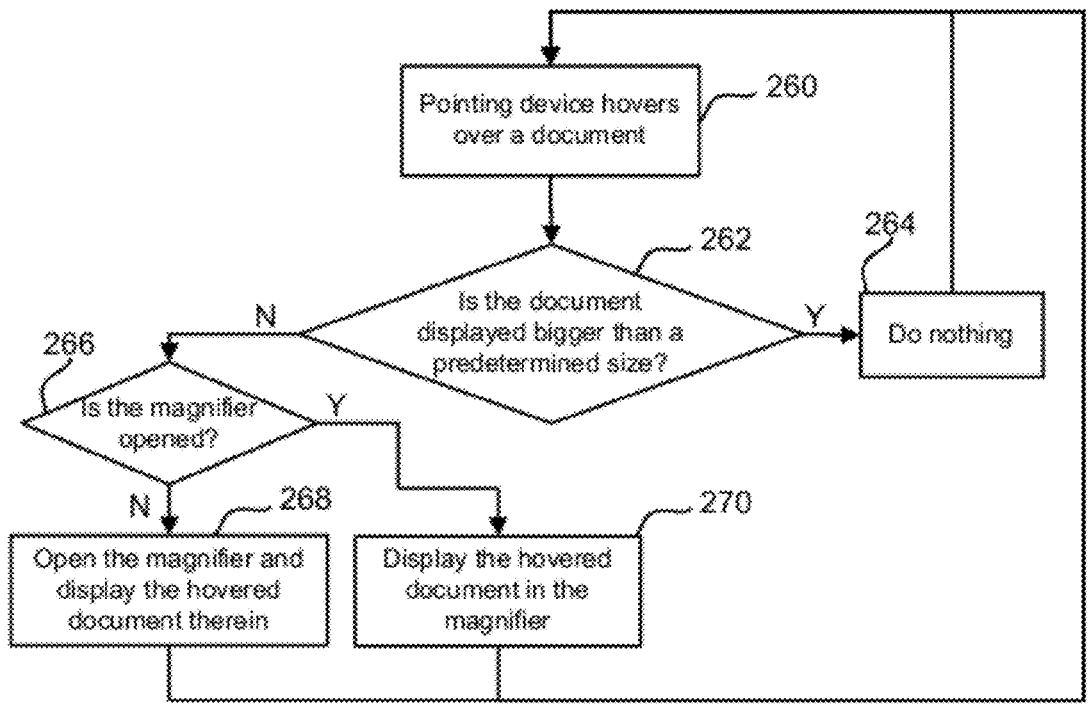
FIG. 5 is an illustrative flow chart of one possible use of a magnifier in accordance with an embodiment of the present invention.

The magnifier is, just as it is named, a mechanism that is adapted to magnify a reduced portion of what is displayed. Lets say that an array of documents displays five documents and the user wants to get a bigger view of the fifth document. The magnifier can be used to put emphasis on the desired fifth document. Turning now to FIG. 5 illustrating an illustrative possible flow chart of an exemplary use of the magnifier. The pointing device hovers over a document that is displayed 260 and the personal setting of the user dictates that the magnifier can be opened by hovering or selecting a document if the document is smaller than a predetermined threshold size 262. If the document is bigger than the predetermined size 262 the hovered document is not shown in the magnifier 264. Conversely, if the hovered document is smaller, the system asks if the magnifier is already opened 266. If the magnifier is already opened the document is shown in the magnifier 270. In contrast, if the magnifier is not opened the magnifier is first opened and the document is shown in the magnified 268. The magnifier can also simply be to magnify the hovered document without recourse to a magnifier that needs to be separately opened. The magnifier is simply the action of magnifying the hovered document.

Figure 6:
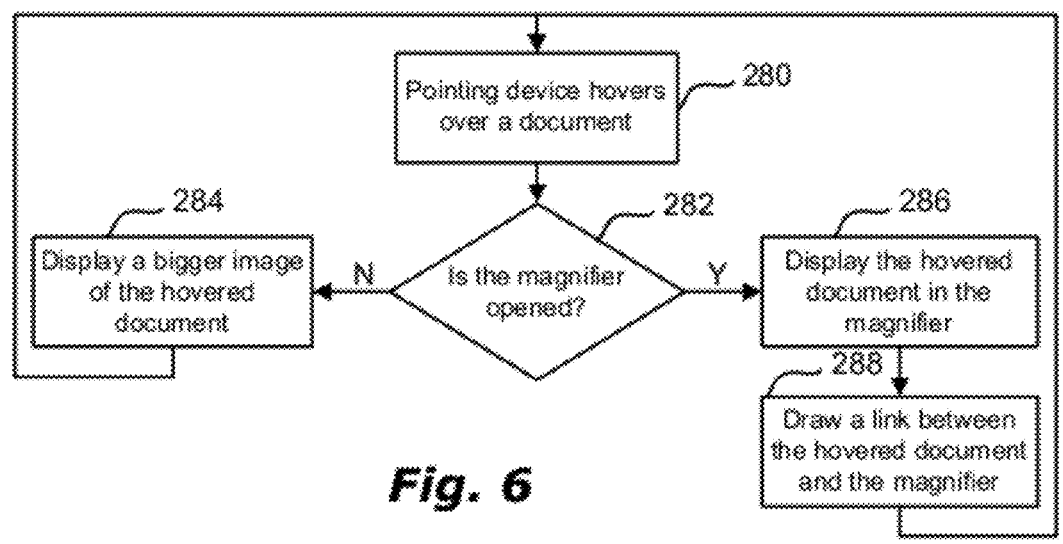
FIG. 6 is an illustrative flow chart of one possible use of a magnifier in accordance with an embodiment of the present invention.

FIG. 6 illustrates an alternate flow chart where the pointing device hovers over a document 280. If the magnifier is opened 282 the document is displayed in the magnifier 286 and a link is drew between the magnifier and the magnified document on the array of documents it is displayed such that the user can easily see the relation between the magnified document and the same document at its place on its array. If the pointer moves over another document and the magnifier displays the newly hovered document the link is updated between the magnifier and the newly hovered document on the array. If the magnifier is not opened 282, a bigger image of the hovered document is displayed 284. In this example we make a distinction between the magnifier and the enlarged image of the document because the magnifier can display more information than a mere thumbnail e.g. the attributes associated with the hovered documents for instance.

Figure 7:
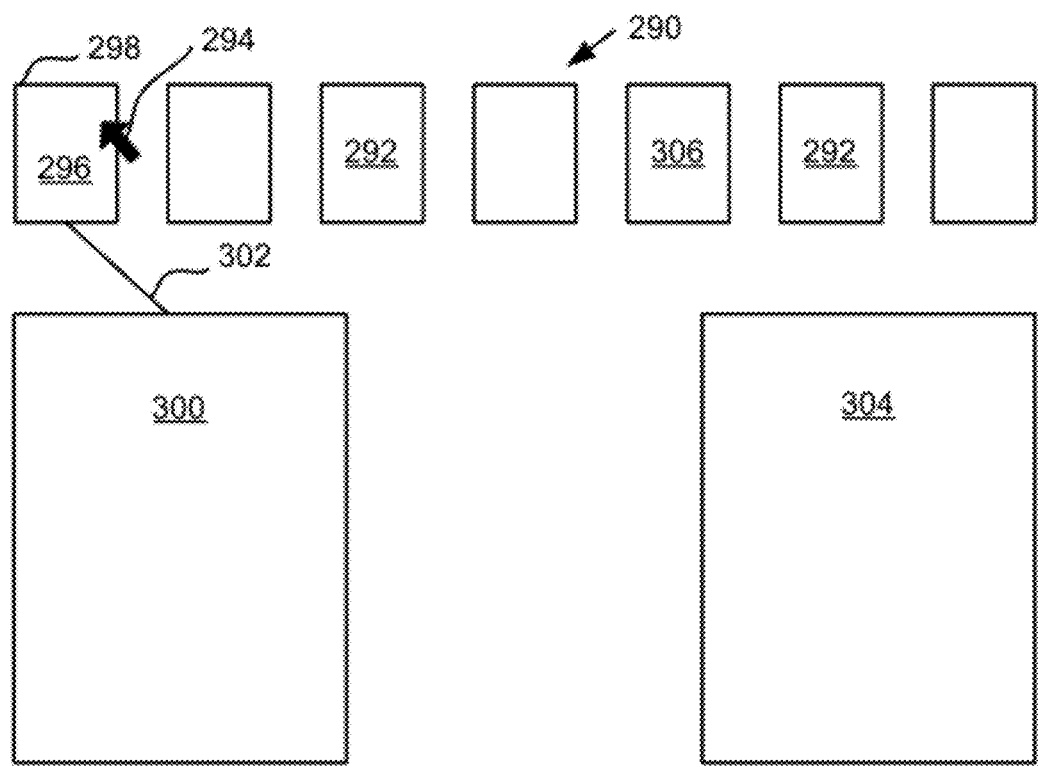
FIG. 7 is an illustrative schematic view of magnified documents in accordance with an embodiment of the present invention.

Turning to FIG. 7, one can appreciate an array of documents 290 grouping a plurality of documents 292. The pointing device 294 hovers a document 296. The hovered document 296 is also displayed with a bold frame 298 to emphasis this is the magnified document in the magnifier 300. A link 302 is drawn between the hovered document 296 and the magnifier 300. Hovering another document would dynamically change the subject document in the magnifier 300 and the associated link 302. The optional enlarged image 304 is simultaneously displaying a larger image of document 306 in addition to the magnifier. The enlarged thumbnail 304 could also be a floating window adapted to more precisely display a document independently from the magnifier 300. The document that appears in the magnifier 300 can also be selected with the pointing device 294 depending on how the system's controls are designed.

Figure 8:
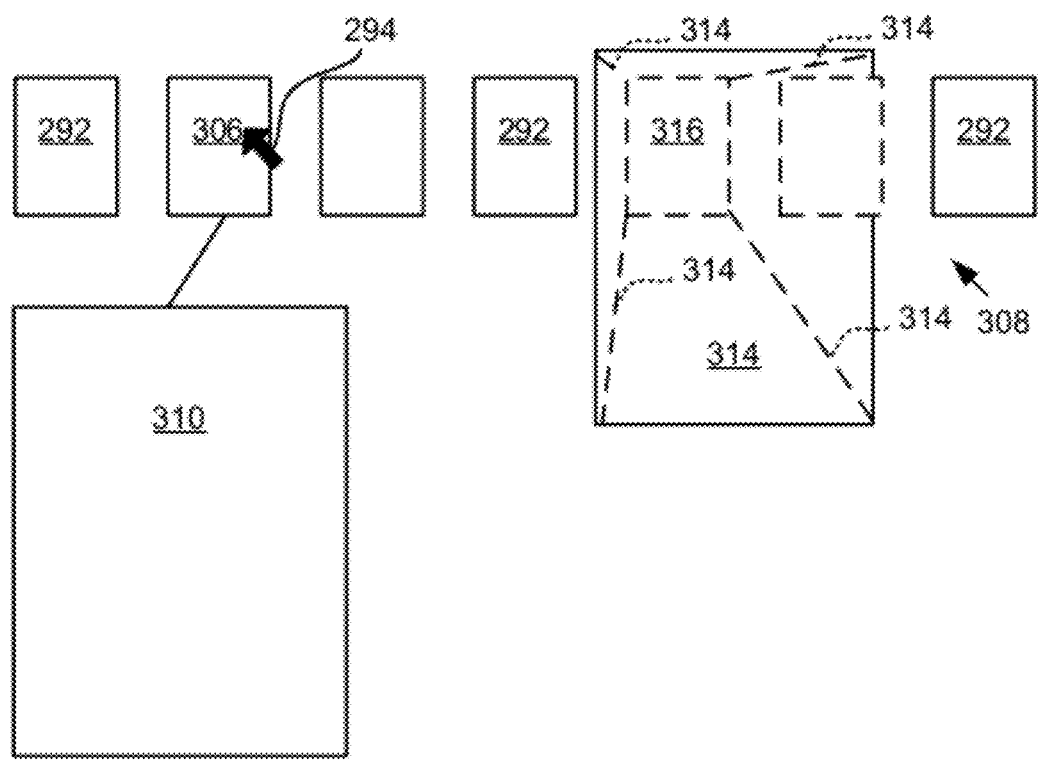
FIG. 8 is an illustrative schematic view of magnified documents in accordance with an embodiment of the present invention.

On FIG. 8 is shown an array of documents 308 grouping a plurality of documents 292. A document 306 is selected by the pointing device 294 to magnify the document 306 in the magnifier 310. Here again a dynamic graphical link 302 is illustrated disposed between the magnifier 310 and the document 306 that is magnified. An alternative embodiment is illustrated on FIG. 8 by magnifying 312 a selected document 316 over the array 308. The magnified document 316 remains slightly visible on, or under, the magnified document 312. Extension lines 314 are dynamically used to emphasis the displayed document 316 among the other non-magnified documents on the array of documents 308. The magnifier can display additional interactive information that can be acted upon by the user (like attributes for example as best seen on FIG. 10).

Figure 9:
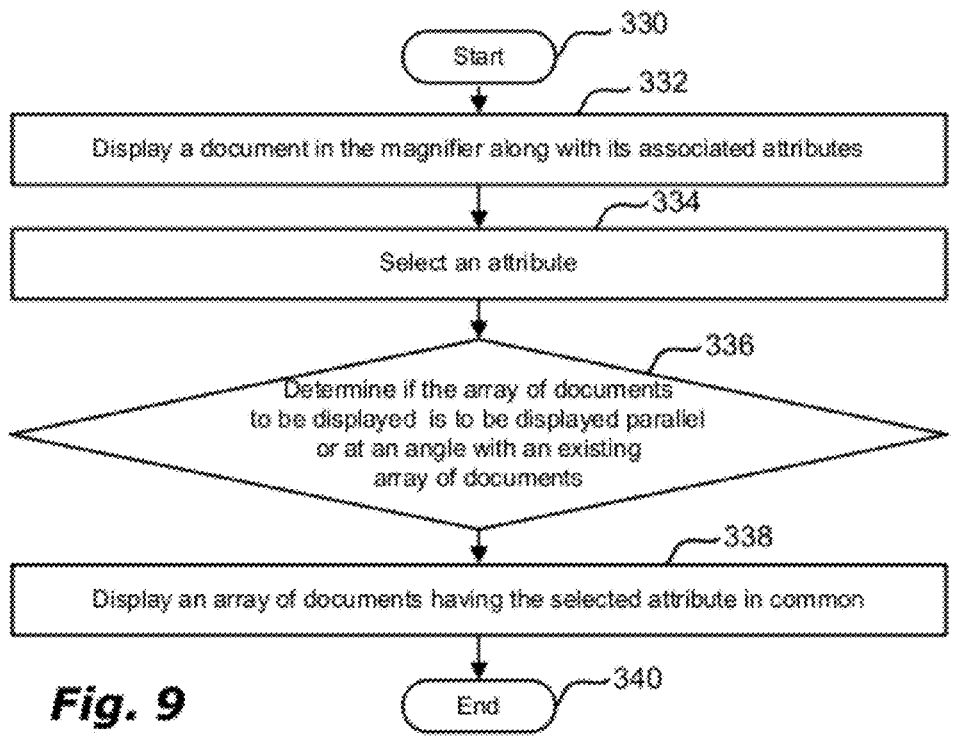
FIG. 9 is an illustrative schematic flow chart of a selection of an attribute via a magnified document (through a magnifier or not) in accordance with an embodiment of the present invention.

Another additional flow chart is displayed on FIG. 9. The exemplary process begins 330 with the display of a magnified document from a first array of documents in the magnifier with its associated attributes 332. The associated attributes displayed along the magnified document can be selected with the pointing device and the user selects one (or a combination of) attribute 334. After, because the selected attribute 334 is material in the query used to select which documents are to be displayed on an additional array of documents, the user needs to specify if the additional array of documents will be displayed parallel from the array from which the magnified document has been selected from, or, at an angle, intersecting or abutting, or in line with the array from which the magnified document has been selected from similarly to the example depicted on preceding FIG. 4. The additional array of documents is then displayed 338 at the desired position and the process ends 340.

Figure 10:
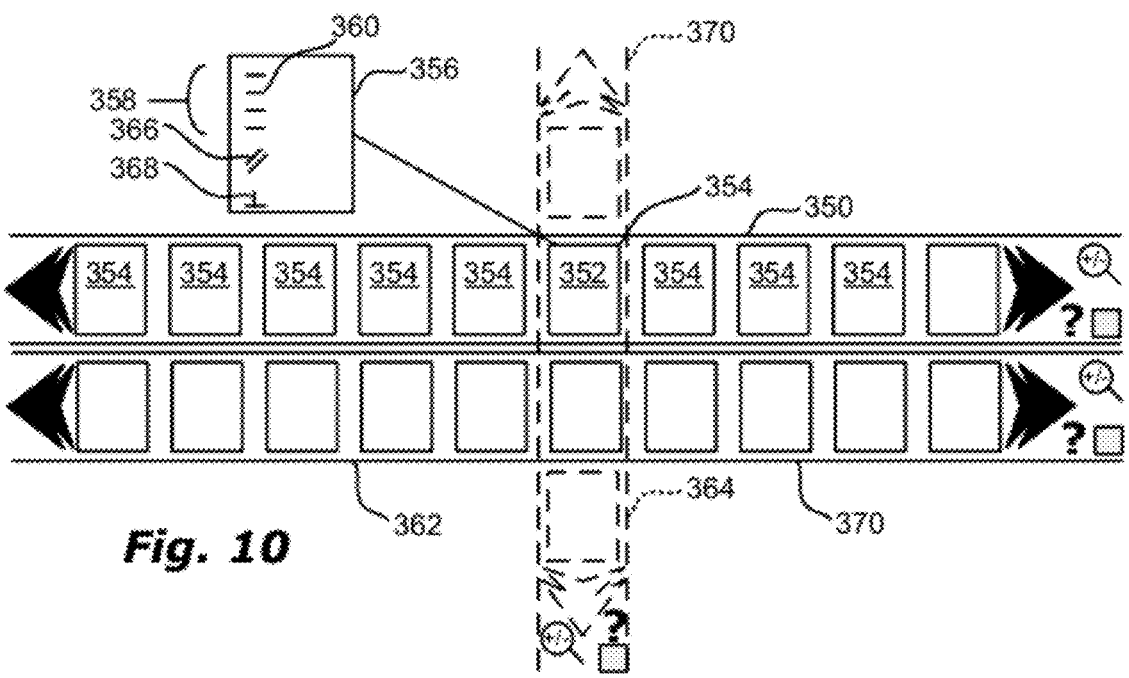
FIG. 10 is an illustrative schematic view of a magnifier interacting with a plurality of arrays of documents in accordance with an embodiment of the present invention.

FIG. 10 illustrates the actions detailed in respect with FIG. 9. The first array 350 is illustrated in bold to represent the active array and is the first array that is visible, the other arrays 362, 364 will be created later as it will be explained below. The size of the array of document 350 is too small to display anything else than a suite of small images of some documents 354. Their associated attributes are thus not displayed along with their related documents 354 nor selectable directly from the array of documents 350. In one embodiment, document 352 is selected, or hovered over, by the pointing device (not shown) to be magnified in the magnifier 356. Five attributes associated from document 352 are displayed 358 on the magnifier 356 because of the larger size of the document 352 provided on the magnifier 356. The attribute selected 360 from the attributes 358 is used to enable and display an additional array of documents 364 presenting a subset of documents sharing the selected attribute 360. The user can also select from the magnifier 356 to display the new array of documents, in the present situation it is displayed parallel 362 (illustrated in thinner lines) or perpendicular 364 (illustrated in dotted lines) from the first array of documents 350 (illustrated in bolder lines). Selecting either the parallel button 366 or the perpendicular button 368 on the magnifier 356 performs the determination of the position of the new array of document 370. In other words, actions can be performed on the magnifier 356 (or an adapted magnified document) because the magnifier 356 is an interactive dialog with a user.

In an alternate embodiment the magnifier can display the attributes 358 and controls of some functions 366, 368 while not displaying a magnified image of the actual document.

Attribute Separation

We turn now to a more precise aspect related to the presentation of the attributes. As we have seen above, each document is associated with its related attributes. The association between a document and its attributes can be graphical. The graphical representation of the attributes can also be disposed adjacent to the document to which they relate. This is desirable because each document has its own set of associated attributes. In an embodiment, each attribute is selectable either, inter alia, by being in the form of selectable text or a selectable button.

The attributes are generally separated in various subsets to ease their classification and be quickly retrieved. Namely, and for illustrative purposes, the subsets could be separated as follows: 1) intrinsic attributes, 2) extrinsic attributes and 3) link attributes (among other possible types of attributes). There are some cognitive advantages to disposed different types of attributes in a particular graphical structure. For instance, referring to FIG. 11a), it can be appreciated that the attribute dialogue 400 is separated in three distinct portions 404, 406, 408 each one adapted to receive one type of attribute e.g. intrinsic attributes 404, extrinsic attributes 406 and link attributes 408. Each portion on dialogue 400 has an identical size 402 adapted to receive a number of attributes. The separation illustrated here uses sort of windows but any other suitable means for separating the kinds of attributes like a line, a space, different colors and the like are encompassed by the present specification.

In contrast, attribute dialogue 410, which depicts the same three different types of attributes (intrinsic attributes 414, extrinsic attributes 416 and link attributes 418), defines a different portion's 416 height 412. The size/height of attribute portions 414, 416, 418 can be manually specified by the user with a simple "select and drag" of the border of the desired border attribute portion 414, 416, 418. The height 412 of the attribute portions 414, 416, 418 can also be automatically adjusted so that each attribute portion 414, 416, 418 has a size that is proportional to the number of attributes therein. In the event the attribute dialogue 410 has a maximum size, it might be possible that one or many attribute portion 414, 416, 418 uses a scroll down bar 419 adapted to navigate among the attributes that are not readily visible on the attribute dialogue 410.

Figure 11:
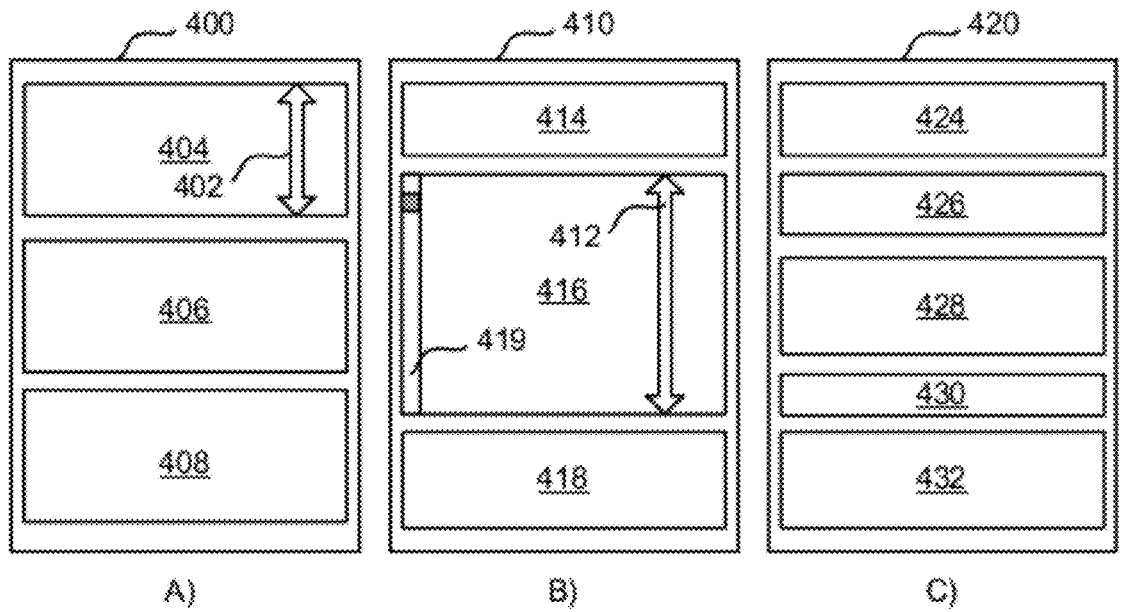
FIG. 11a), 11b), 11c) are various illustrative schematic view of an attribute dialogue in accordance with an embodiment of the present invention.

FIG. 11c) illustrates an attribute dialogue 420 that is adapted to receive five (5) different attribute portions 424, 426, 428, 430, 432, each having its respective size.

Grouping of Arrays

Figure 12:
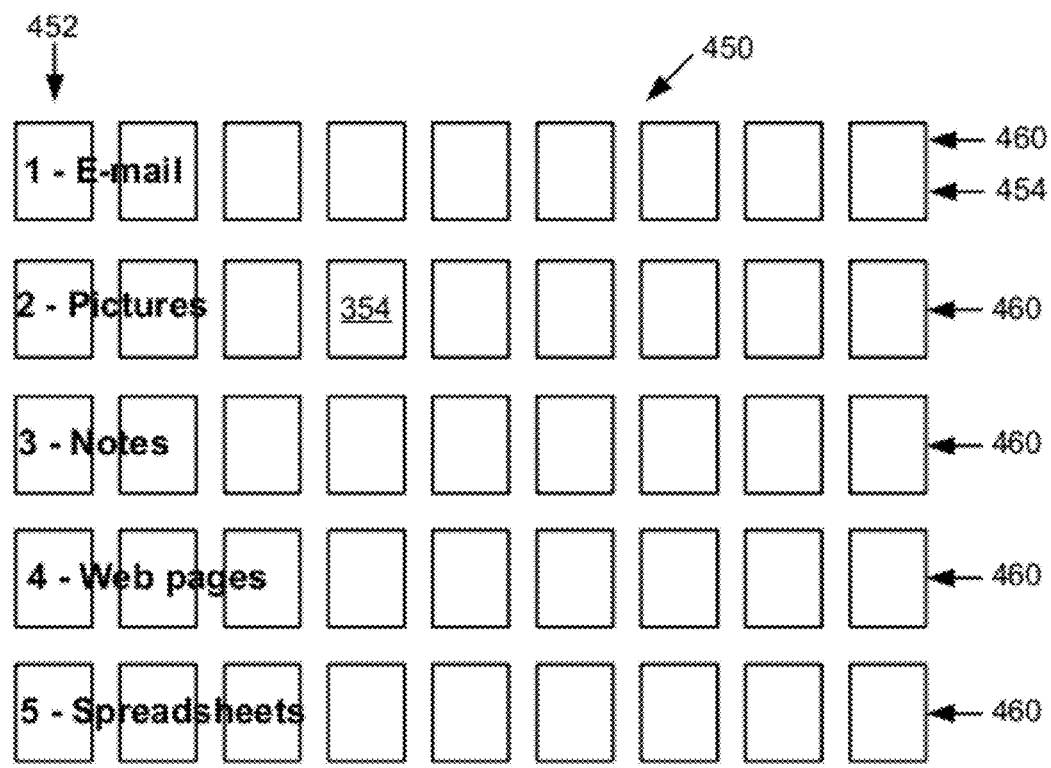
FIG. 12 is an illustrative schematic view of a matrix of documents composed of a plurality of juxtaposed arrays of documents in accordance with an embodiment of the present invention.

Referring now to FIG. 12 where an array of documents, being basically a matrix of documents 450, is illustrated. The matrix of documents 450 has several columns 452 and several rows 454 that are substantially aligned thus offering a comprehensive document display layout. The array of documents 450 can be produced by displaying a group of documents or by being built from a juxtaposition of different longitudinal arrays of documents 460 (arrays having an axis-like layout). In the present situation each horizontal array of documents has been individually identified with a sequential number and a title. An alternate example of a juxtaposition of an axis of documents is illustrated on FIG. 13.

Figure 13:
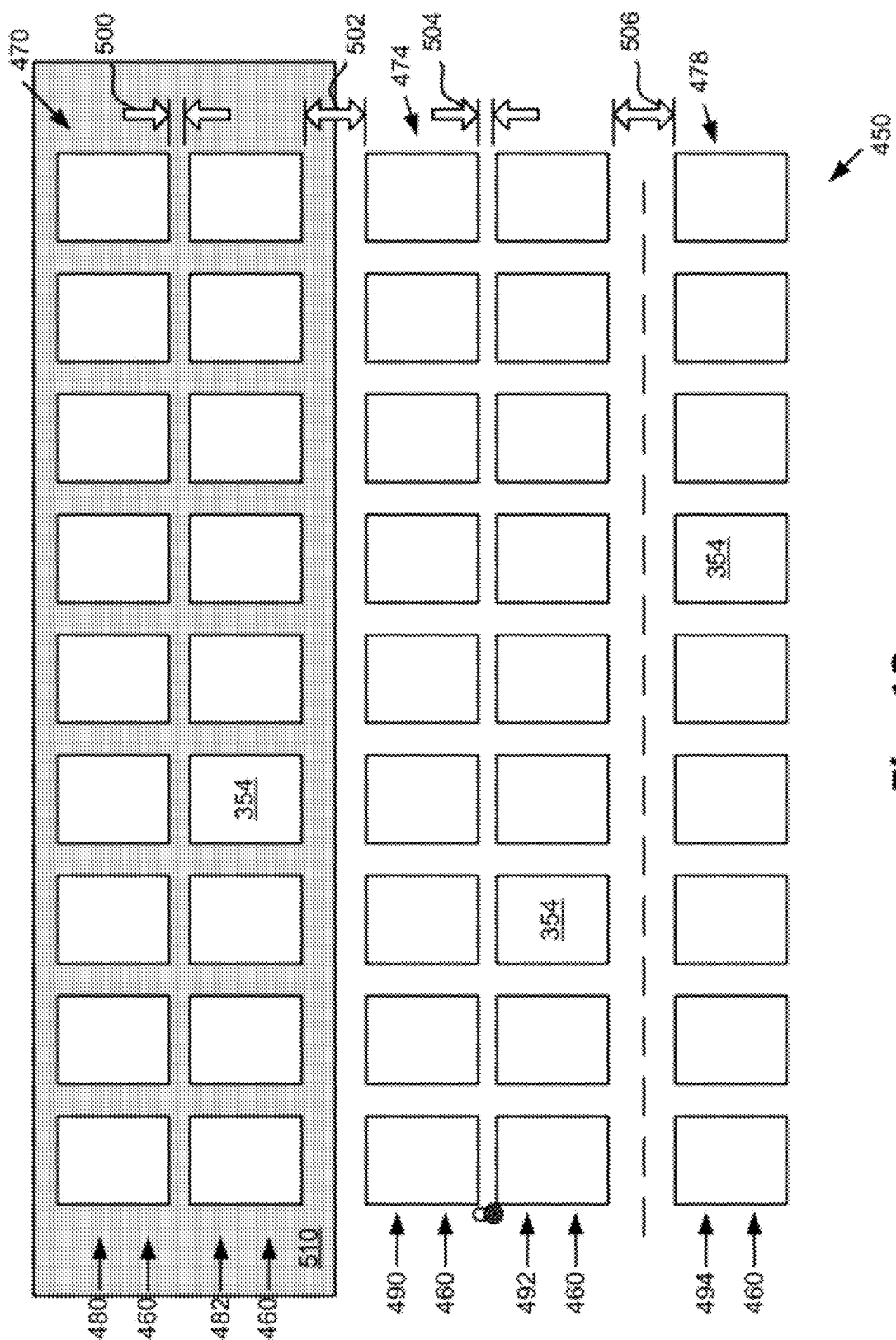
FIG. 13 is an illustrative schematic view of a plurality of groups of arrays of documents in accordance with an embodiment of the present invention.

Still on FIG. 13, it can be appreciated that each array (in the present embodiments, axis) of documents 460 is adapted to be useable individually, as it is the case for array 494, or grouped with other(s) array(s). Three distinct groups of arrays 470, 474, 478 are displayed on FIG. 13. Group of array 470 is composed of two arrays 480, 482, group of arrays 474 is composed of two arrays 490, 492 and the last group of arrays 478 is composed of a single array 494.

The distance 500, 502, 504, 506 between arrays of documents 460 is adjustable. It might be desirable to set a larger distance 502, 506 between distinct adjacent groups of documents and a smaller distance 500, 504 between adjacent arrays of documents that are part of the same group 470, 474, 478 of arrays of documents. In the present situation the distance 500 between arrays of documents 480, 482 is shorter than the distance between groups of arrays of documents 470 and 474. It might be desirable that the distance 502, 506 between groups of arrays of documents and distances between arrays of documents that are part of the same group 470, 474, 478 of arrays of documents remain consistent to maximize the graphical rendering of the matrix of documents 450 such that it is easy to distinguish groups 470, 474, 478 of arrays of documents and arrays of documents. In the present illustrative example the number of array of documents part of groups of array 470, 474 is limited to two (2). Additional arrays of documents could be included in a group of arrays or removed from a group of arrays without departing from the scope of the present invention.

The addition, or the removal of arrays of documents, (axes of documents in the present illustrative example) from a group of arrays of documents can be made through a dialogue where a user defines the grouped axes and the order thereof in each group of axes. The order of the group of axes can also be managed in a similar fashion.

To help support the graphical rendering of a matrix of documents including distinct groups of arrays of documents it is possible to add a graphical distinctive feature to a group of arrays of documents and/or an array of documents. The group of documents 470 on FIG. 13 is illustrated with a background color 510 that efficiently distinguishes the latter group of documents 470 from the other groups/arrays of documents. A dotted line 514 separates the group of documents 474 from the group of documents 478 in addition to the noticeable distance 506 therebetween. Other colors, texture and means to graphically discriminate arrays of documents and groups of arrays of documents on a matrix of documents 450 not specifically mentioned but directed to the same goal might become apparent to people skilled in the art of document management in light of the present disclosure and would be considered within the scope of the present invention.

Figure 14:
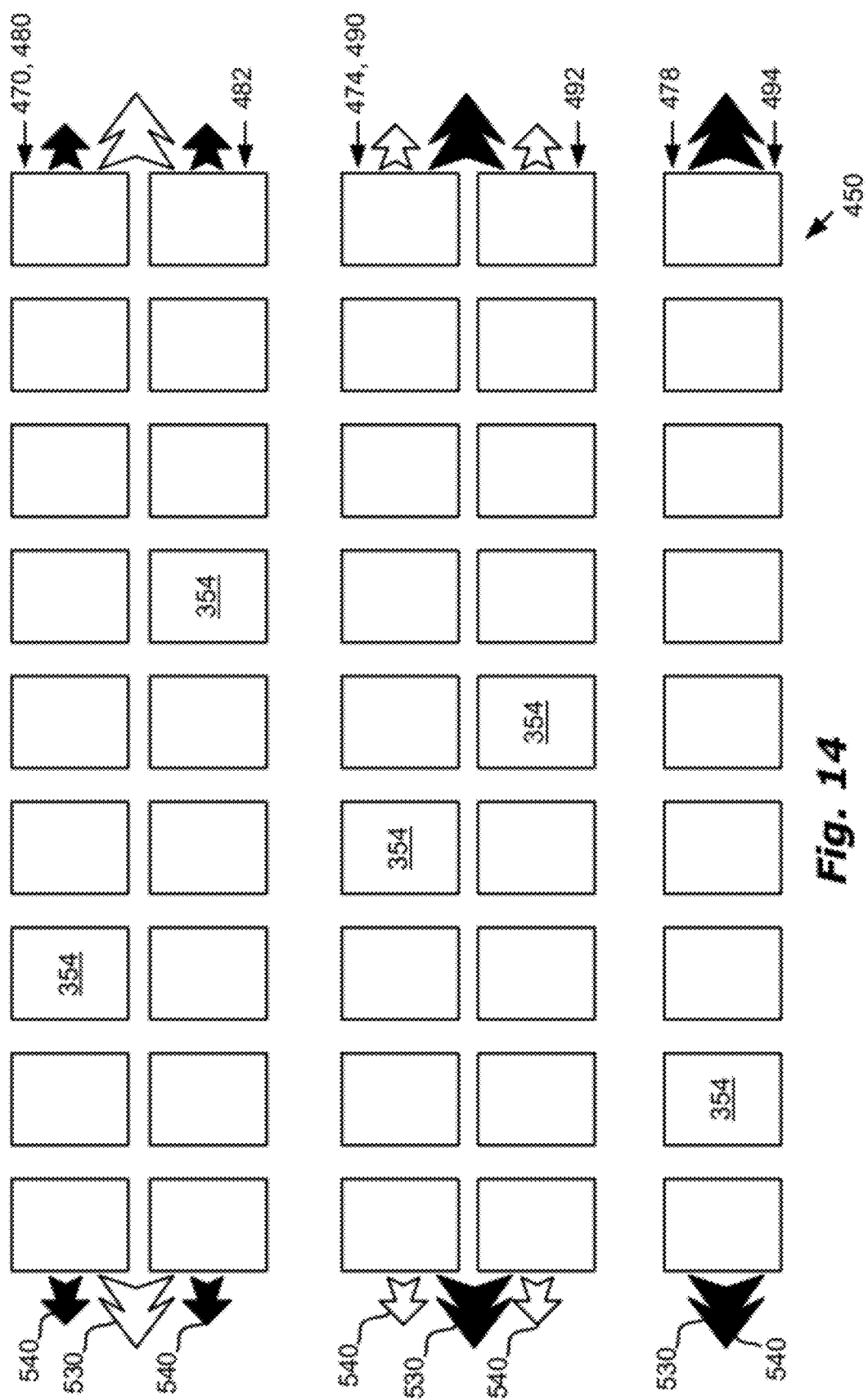
FIG. 14 is an illustrative schematic view of a plurality of groups of arrays of documents in accordance with an embodiment of the present invention.

Turning now to FIG. 14 where one can appreciate the groups of arrays of documents 470, 474, 478 presented on preceding FIG. 13. Each group of arrays of documents 470, 474, 478 can be navigated independently with a navigation tool 530. The navigation tool 530 is present for each group of array of documents 470, 474, 478 for simultaneously navigating along a specific group of arrays of documents 470, 474, 478. When navigating along a group of arrays all arrays of documents are moved altogether such that the whole group of arrays of document is navigated by scrolling along the display (not illustrated). For instance, group of array 470 comprises array of documents 480, 482. When one of the arrows on the navigation tool 530 is selected both arrays of documents 480, 482 are moved together. This also allows to relatively positioning each group of arrays of documents therebetween.

Each of the arrays of documents 480, 482 from the group of arrays of documents 470 also comprises an array navigation tool 540 adapted to independently move their respective array of documents 480, 482. The array navigation tool 540 allows to independently positioning each array of documents 480, 482 in their own group of arrays 470 such that each array of documents 480, 482 is shown at the desired position in respect with the other array of documents part of the same group of arrays. In FIG. 14, the group navigation tool 530 is display with a lighter color meaning it is not enabled because the array navigation tools 540, depicted in solid color, are enabled. Conversely, group navigation tool 530 of group of arrays 474 is enabled while array navigation tools 540 are not enabled to avoid any confusion for the user. Alternatively both the group navigation tool 530 and the array of documents navigation tool 540 can be enabled at the same time thus allowing more simultaneous navigation choice to the user. Group of arrays of documents 478, including only a single array 494, is illustrated with a single combined group navigation tool 530 and array of documents navigation tool 440. Finally, it has to be noted that the documents on the matrix of documents formed by the juxtaposition of arrays of documents 480, 482, 490, 492, 494 are vertically aligned to facilitate their ordering and their viewing.

Figure 15:
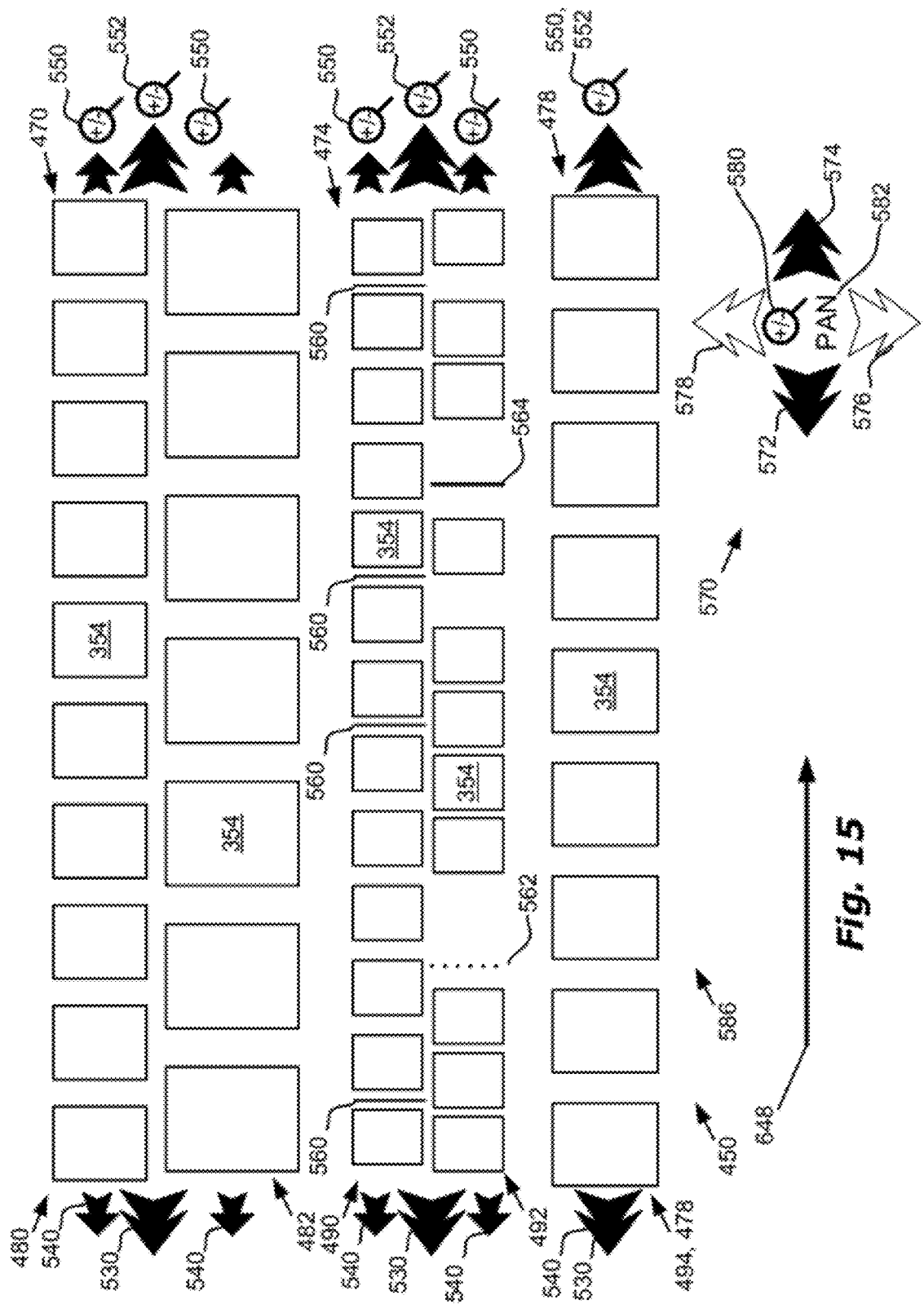
FIG. 15 is an illustrative schematic view of a plurality of groups of arrays of documents in accordance with an embodiment of the present invention.

Group of arrays of documents 470 on FIG. 15 further comprises a group of array magnifier 552 adapted to magnify or reduce the size of the group of array 470. Also, each of the arrays of documents 480, 482 in the group of arrays of documents 470 has its own array magnifier 550 adapted to independently magnify each array 480, 482. It is possible to appreciate from FIG. 15 that array of documents 482 is slightly magnified compared to counterpart array of documents 480 within the same group of arrays of documents 470. In contrast, group of arrays of documents 474 has been reduced in size with its respective group of array magnifier 552 such that the documents on the arrays 490, 492 are substantially smaller than the documents on arrays of documents 480, 482.

Group of arrays of documents 474 is also illustrating various timescales applied to arrays of documents 490, 492. Array of document 490 uses a non-linear timescale where the distribution of documents is at constant intervals therebetween while array 492 uses a linear timescale where the duration of each unit of time is equal. Time marks 560 disposed on the array of documents 490 are identifying a change in days (for instance but it could be any other length of time, weeks, months, . . . ). Visually distinctive time mark 562 identifies a change in day and time mark 564 identifies a change in week along the longitudinal distribution of documents along timeline 648. The timescale of each array of documents in the same group of documents can be independently managed. The timescale can also be selected at the same time for all the arrays of documents inside a same group of documents.

In the illustrative examples of FIG. 14 and FIG. 15 it is possible to appreciate that there are navigation tools 530, 540 for each array of documents. In an alternate embodiment, not illustrated though, a single navigation tool (like navigation tool 530) can be used to manage the longitudinal position of all the arrays of documents. One way to work this out is to have the ability to select an array of document or a group of array of document—it might be done by a simple click on the desired array of documents. Once an array of documents is selected the single navigation tool is configured to move it longitudinally along. This saves useful viewing space while offering the same functions as previously presented. The spacing between groups of arrays of attributes and/or arrays of attributes can be set by dragging and dropping an array of documents in respect with another array of documents on the display.

Global navigation tools 570 are adapted to navigate all the groups of arrays of documents 470, 474, 478 (and all the arrays of documents) at the same time. Arrows 572, 574 are enabled—thus in solid color—and are adapted to move laterally all the groups of arrays of documents 470, 474, 478 together in one movement. Similarly, arrows 576, 578 are enabled and shown in solid color and are adapted to move vertically all the groups of arrays of documents 470, 474, 478. A global magnifying/reducing function 580 is embedded in the global navigation tool to magnify or reduce the size of all the groups of arrays 470, 474, 478 at the same time and with similar amplitude. A "PAN" function 582 is adapted to move the entire screen with a drag-hold-and-drop action on the display area 586.

Predetermined Arrangement of Arrays of Documents

Figure 16:
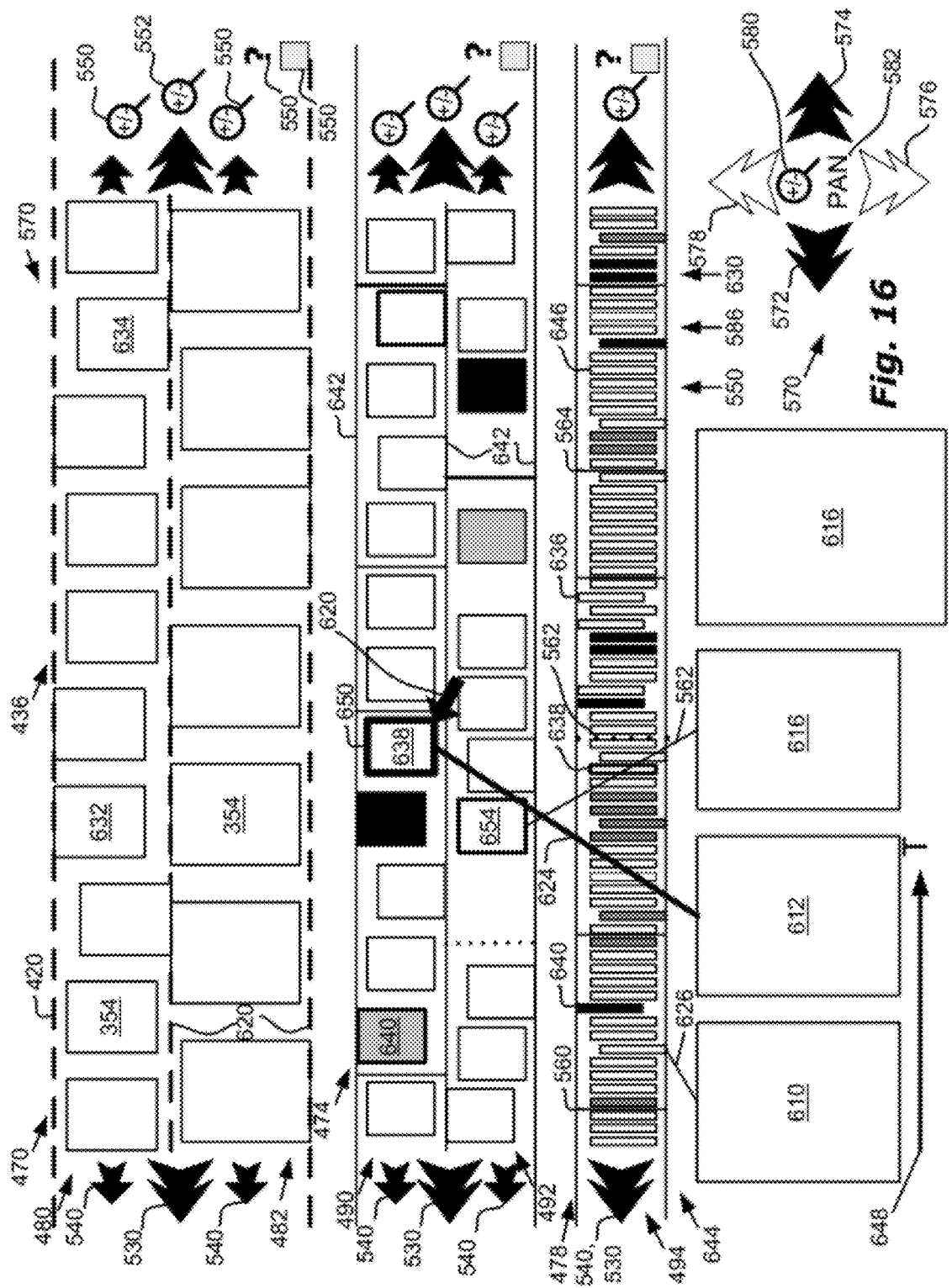
FIG. 16 is an illustrative schematic view of a plurality of groups of arrays of documents in accordance with an embodiment of the present invention.

FIG. 16 illustrates an exemplary predetermined arrangement of array of documents, or "workspace", 630 that displays a plurality of preferred groups 470, 474, 478 of arrays of documents with arrays of documents 480, 482, 490, 492, 494. Groups of arrays of documents are displayed and positioned as desired by the user before being saved as "workspace" 630. The user thus can quickly recall the "workspace" 630 once the desired groups of arrays and array of documents layout is saved. Additional arrays of documents that are not part of groups of arrays can also be displayed and positioned on the "workspace" 630 as desired by the user. In the present embodiment all the arrays of documents are axes of documents disposing documents along a substantially longitudinal alignment representing a timeline 648. Selecting the appropriate function on a user-selectable menu can save the "workspace" 630. The saving of the "workspace" 630 is similar to taking "a picture" of the actual display although the saving keeps full recall and functional capabilities. Many workspaces can be saved and recalled when needed to perform a specific task requesting a specific representation of the documents.

Various exemplary options are offered when a workspace is saved. It is possible to decide at which longitudinal position each array of documents, and each group of documents, will have on the display when they are recalled. For instance, each array of documents can be recalled 1) placing the newest document thereon at the right side of the display such that the right end (latest in time) is next to the right side of the display, 2) at a precise time, 3) at a precise document and 4) at the same position as it was at the moment it is saved. These options are available through a dialogue and it is up-to the user to select what setup is desired when a workspace is opened. One exemplary configuration could be to ask to position all arrays at their latest document on the timeline such that it is the most recent image of the content of each array of documents.

Group of arrays 470 comprising arrays of documents 480, 482 illustrated on the exemplary "workspace" 670 of FIG. 16 further array borders 620 adapted to border the suite of documents 354. The array borders 620 are provided to confine the documents 354 on an array of documents and also emphasis the position of each document 354 in respect to the array borders 620. For example, document 632 is disposed above on the array of documents 480 as opposed to document 634 that is disposed low on the array of documents 480. The upper or the lower side of the offset documents 632, 634 are preferably overlapping their closer array border 620 to improve the visual effect by discontinuing the array border 620. A viewer more easily notices this discontinuity of the array border 620.

Group of arrays of documents 474 illustrates further visual distinctive features applied to selected documents. In addition to the vertical offset visual distinctive feature 636 a document border visual distinctive feature 638 and a document shading (or color) visual distinctive feature 640 are illustrated. Here again array borders 642 are present along the arrays of documents 490, 492.

Still referring to FIG. 16 it can be appreciated that group of arrays 478, that actually includes a single array of documents 494, is provided using a very dense document distribution called DNA mode 644—actually referring to the graphical rendering of DNA test films in genomics depicting series of small bars of various thicknesses. The DNA mode 644 provides a series of lines 646 each representing a document. This type of graphical rendering allows to display a maximum of documents on a display so that it is possible to appreciate documents on the array of documents 494 over a substantially long period of time 648. Time marks 560, 562, 564 are still represented on the array of documents 494 to show change in days or weeks or months or years or customized time periods.

The DNA mode 644 also displays visual distinctive features 636, 638, 640 so that a viewer can quickly figure out related documents over a long period of time. Coloured documents are also provided to further discriminate some documents. This is one way to help provides insights about trends provided by a distribution of documents over a period of time, inter alia.

Each array of documents can be displayed using various display modes. For instance, by selecting the desired array of documents, a user can change the display mode from thumbnail size to DNA size. Alternatively, the DNA mode can be automatically enabled with an array when the zoom is out enough to cross a predetermined mode threshold. Selecting the appropriate menu from linear timescale to non-linear timescale and vice-versa can also change the timescale used to represent documents on an array of documents.

The magnifier 610 magnifies a document from the DNA array of documents 494 to allow a viewer to see more details about the targeted document as indicated with link 626. Similarly, magnifier 612 is displaying document 638 with more information and a bigger image of document 638. Document 638 is also shown with an extra bold frame 650 and an extra bold link 624 indicating it is the active document pointed by pointing device 620. A third magnifier 614 is illustrated showing a more detailed view of document 654 from array of documents 492. Floating window 616 is anther alternate means to illustrate a document in a bigger fashion on the display as decided by the user.

Two groups of arrays can be combined by dragging one group of arrays in another with group dragger 602. For example, group of arrays 478 can be dragged with its group dragger 602 in group of arrays 470. Group of arrays 470 will show three arrays 480, 482, 494 therein once group of arrays 478 is dragged. The added array 494 will match the timescale of the group of array in which it is imported unless otherwise decided by the user. This function is going to be better described below in respect with FIG. 18 and FIG. 19.

Figure 17:
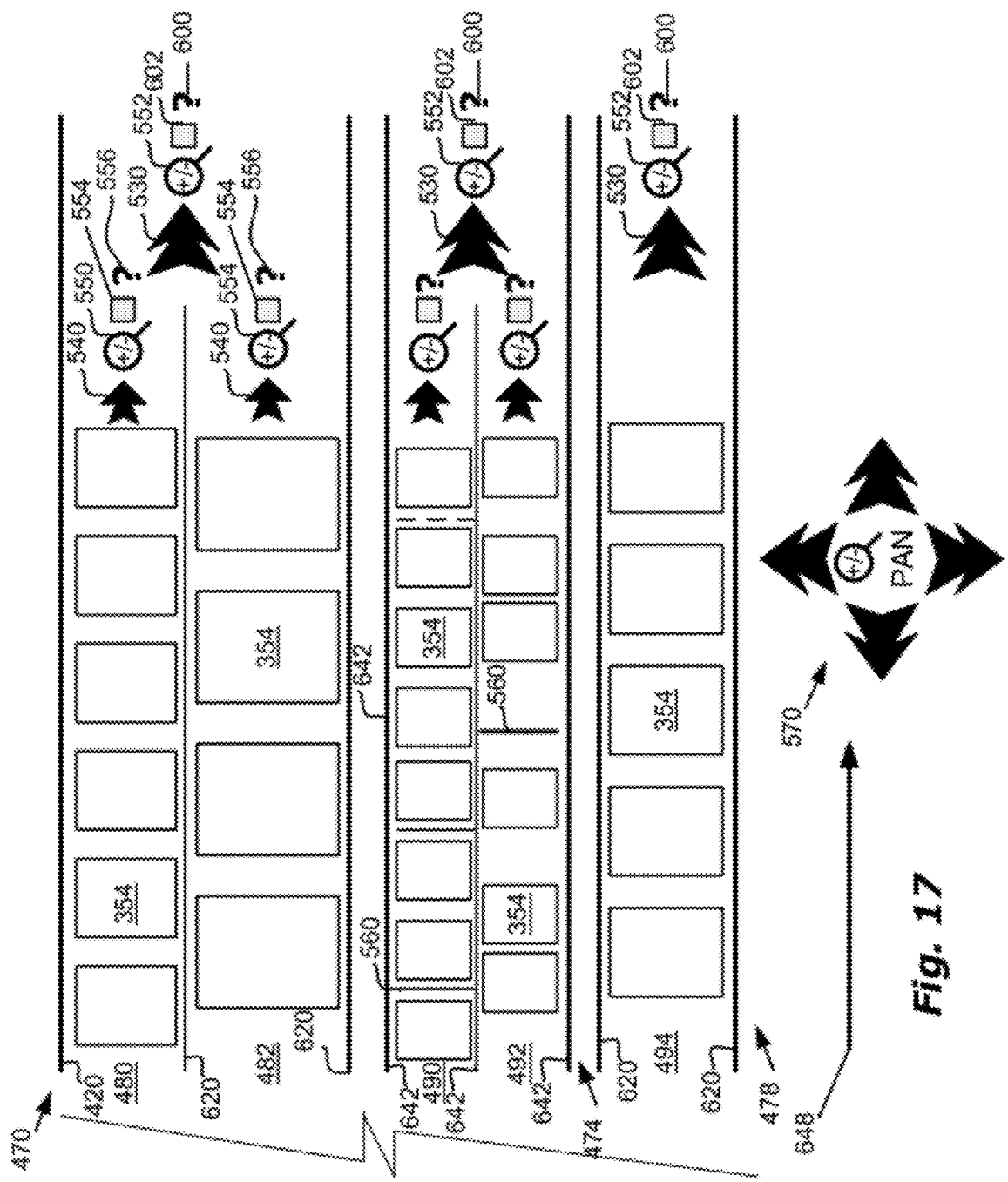
FIG. 17 is an illustrative schematic view of one side of a plurality of groups of arrays of documents in accordance with an embodiment of the present invention.

FIG. 17 illustrates another possible embodiment displaying a portion (for the purpose of the present specification) of a plurality of groups of arrays 470, 474, 478 where some additional functions related to each group of arrays, and possibly related to arrays 480, 482, 490, 492, 494, are shown. Each group of arrays 470, 474, 478 has its own group navigation tool 530, group of arrays magnifier 552, group dragger 602 and group information icon 600. They all affect the group they belong to as a whole. This way, it is possible to longitudinally navigate a group with all its related arrays of documents in respect of other groups of arrays of documents with the group navigation tool 530, zoom in/out the group with the group magnifier 552, move the group of array on the display among between two other groups or to merge a group with another group with the group dragger 602 and get information (some information related to the desired group is editable this way too similarly to the information illustrated for an array on FIG. 22) about a particular group of array with the group information icon 600.

Similar functions are provided to each array, individually, such that an array in a group can be longitudinally navigated in respect of other arrays of documents with the array navigation tool 540, zoomed in/out the array with the array magnifier 550, moved on the display between two other arrays (within or not within the same group or it could be used to assemble arrays in group) with the array dragger 654 and get information (some information related to the desired array is editable this way too) about a particular array with the array information icon 556. This way maximum versatility is obtained for each group of arrays and each array individually to provide to a viewer the view s/he wants.

Figure 18:
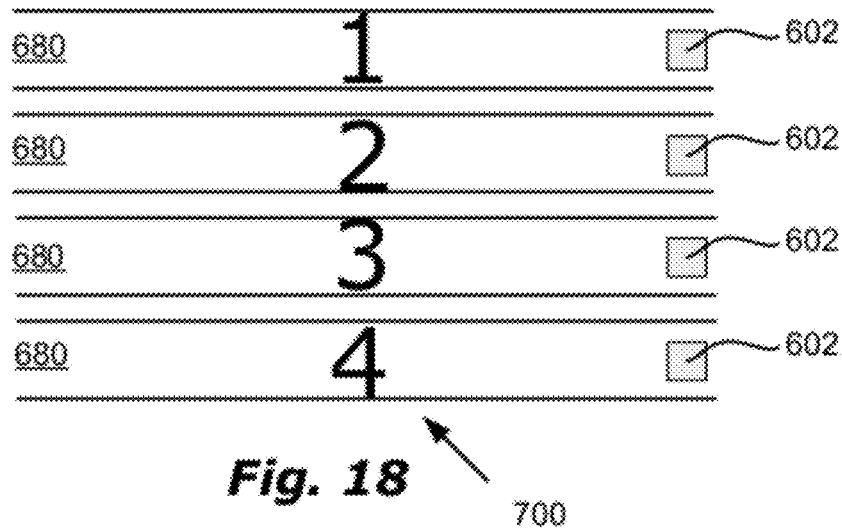
FIG. 18 is an illustrative schematic view of an arrangement of arrays of documents.
Figure 19:
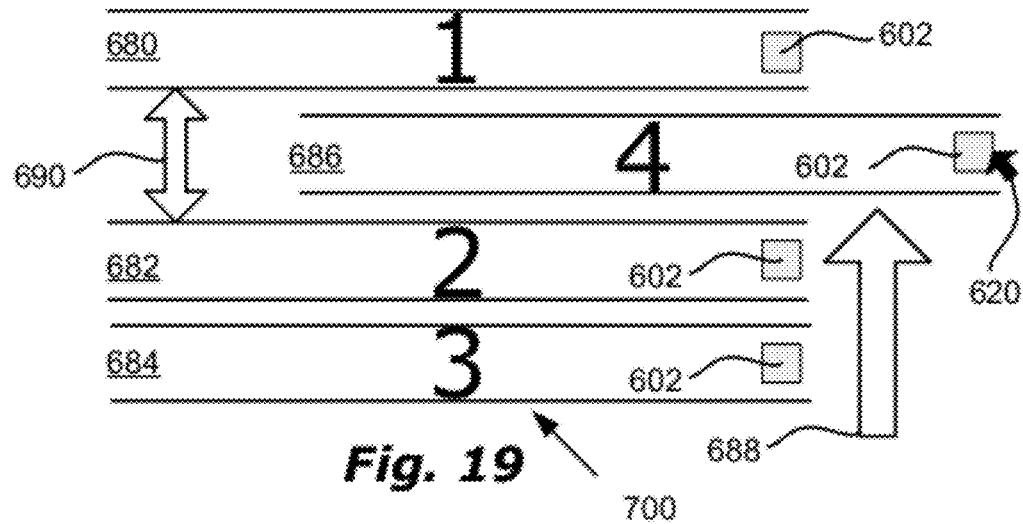
FIG. 19 is an illustrative schematic view of a change in the arrangement of the arrays of documents of FIG. 18.

Turning now to FIG. 18 and FIG. 19 illustrating a change in groups of arrays of documents 680, 682, 684, 686 where one can appreciate the relocation 688 of group of arrays 686. By using the pointing device 620 and the group dragger 602, the group of arrays 686 is moved 688 between other groups of arrays 680, 682. At the same time the distance 690 between groups of arrays 680, 682 expands to provide enough room to accommodate the newly located group of arrays 686.

A similar function is available for each array of documents such that each array can be manipulated. In so doing an array of document can be extracted from a group of arrays and inserted in another group of arrays. A dragged array of documents might be moved outside a group of array and stand alone, or, the array ordering inside a group of arrays can be modified as desired by a user.

Figure 20:
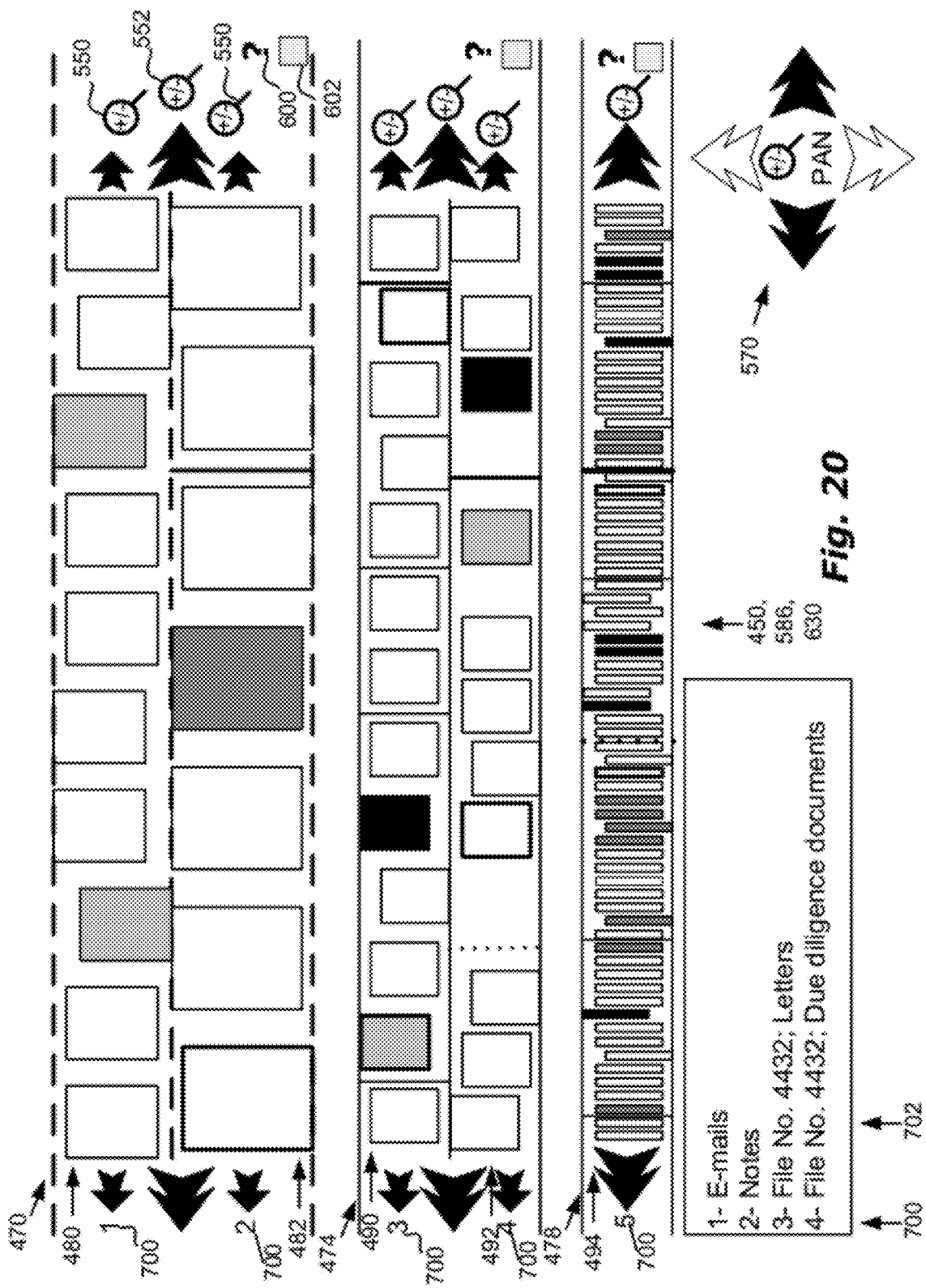
FIG. 20 is an illustrative schematic view of a plurality of groups of arrays of documents with associated array names in accordance with an embodiment of the present invention.

Arrays of documents are identified to ease their recognition by a viewer. As illustrated on FIGS. 18, 19 and 20, an array numeral identification 700 (1 to 5) is associated with each array of documents 480, 482, 490, 492, 494 and appears on the extreme left of each array of documents 480, 482, 490, 492, 494. The array numeral identification 500 can be a sequential number representing the order of creation of each array of documents. Additional text 702 can be added and associated with each array numeral identification 700 if so desired by the user. The additional text 702 might be a title or the query leading to the display of a subset of document building the subject array of documents. In the present example array of documents 480 is associated with numeral reference "1" followed by the title "E-mails".

Figure 21:
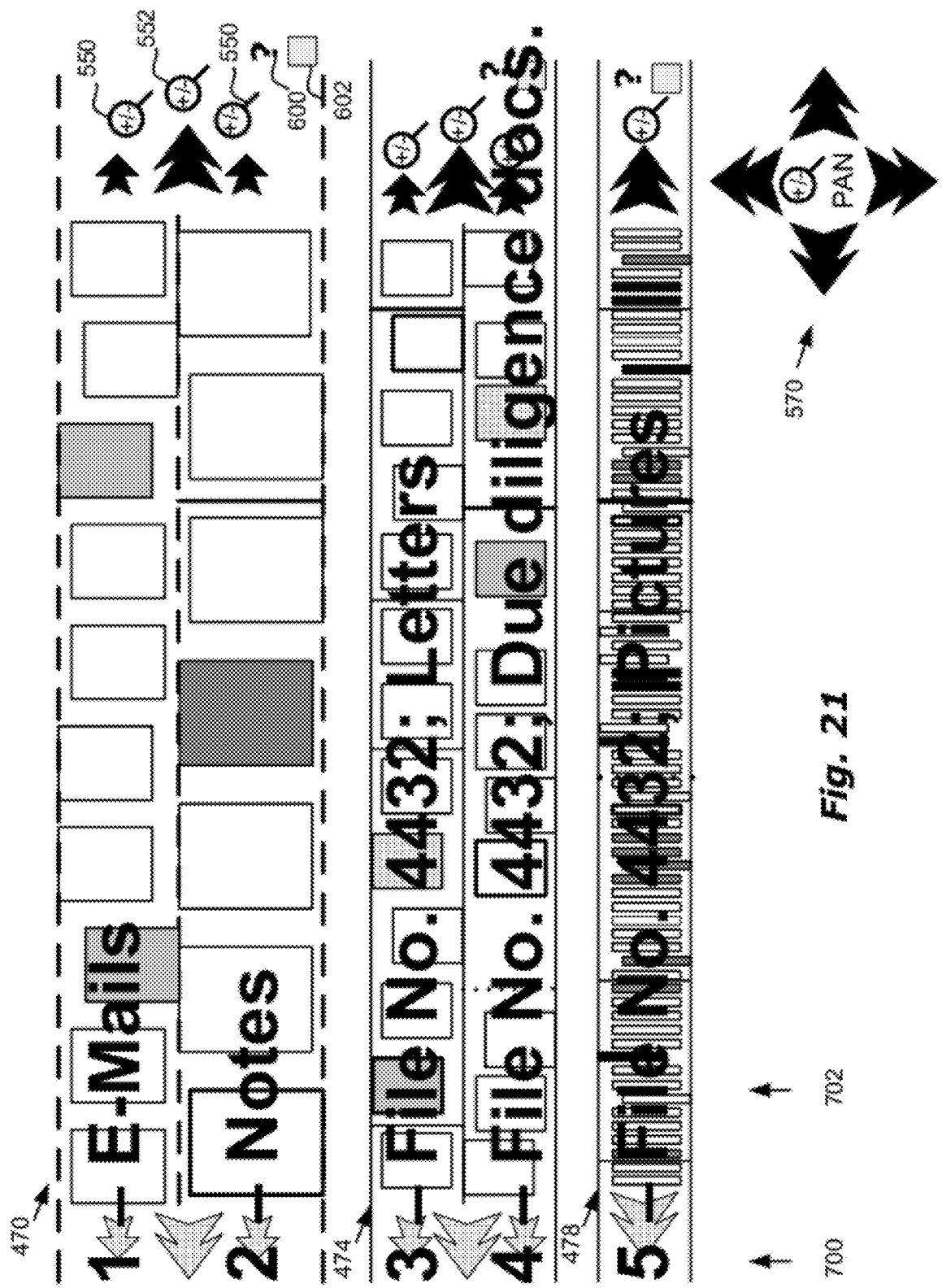
FIG. 21 is an illustrative schematic view of a plurality of groups of arrays of documents with associated array names in accordance with an embodiment of the present invention.

The array numeral identification 700 and the additional text 702 can selectively appear over their respective array of documents 480, 482, 490, 492, 494 when a key or a menu element is selected. This selective display reminds the user/viewer which array is what. Groups of array of documents 470, 474, 478 are also subject to a similar numeral identification with additional text to identify each group of arrays. This embodiment is illustrated on FIG. 21. Each array of documents and each group of arrays is provided with an information dialog.

Figure 22:
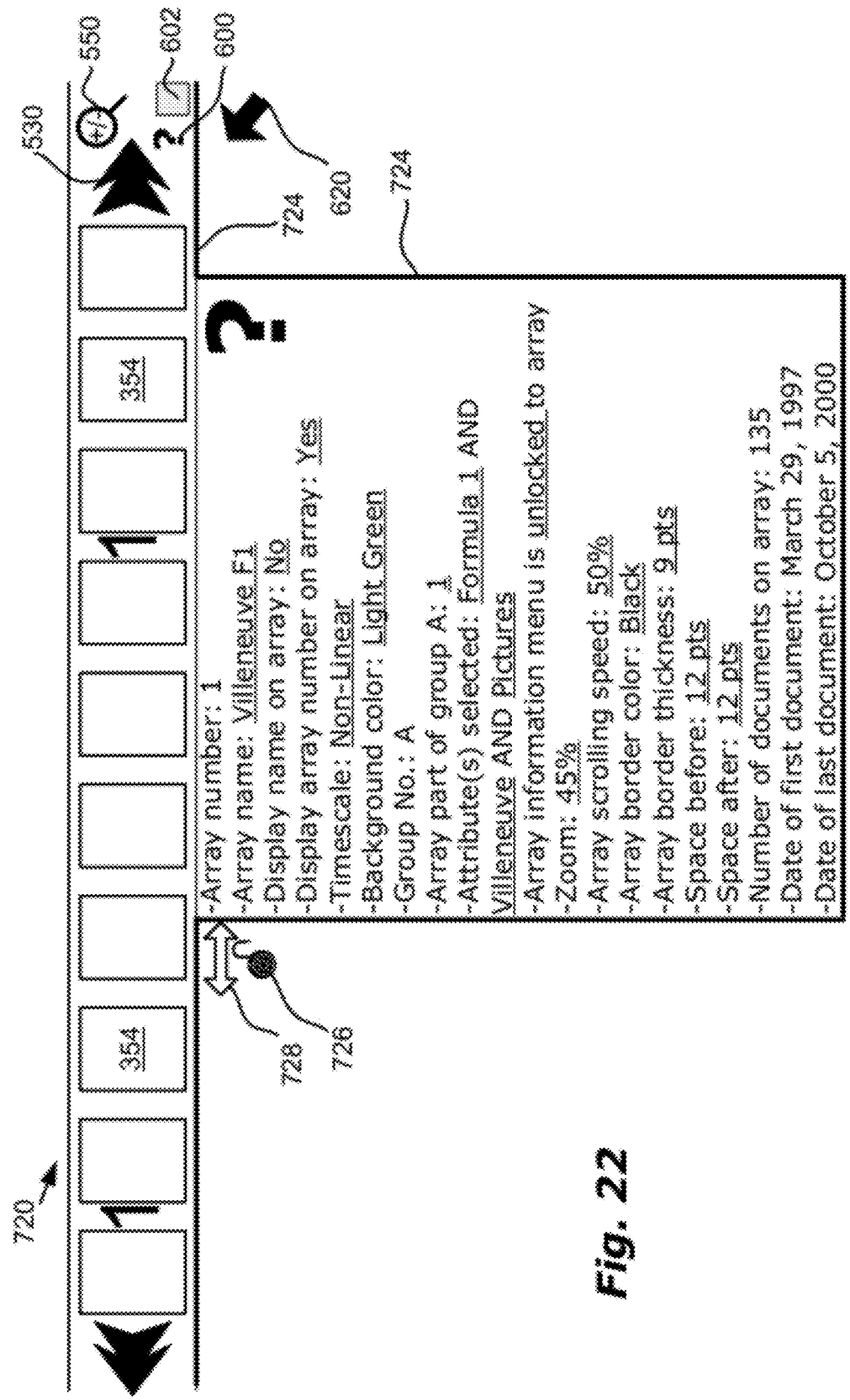
FIG. 22 is an illustrative schematic view of a plurality of groups of arrays of documents with associated array names in accordance with an embodiment of the present invention.

FIG. 22 illustrates an array of documents 720 displaying a plurality of documents 354. An array information icon 600 is provided in association with the array of document 720. The array information icon 600, once selected, displays an array dialog 722 listing properties related with the array 720. Within the array dialog 722 are listed, inter alia, user-selectable or user-modifiable information that are shown underlined in array dialog 722. A non-exhaustive list of information is shown on the dialog 722 and is believed to speak from itself without additional explanation. A bold line 724 visually connects the array of documents 720 with the array dialog 722 in a visual fashion.

The array dialog 722 can optionally be longitudinally locked 726 or unlocked to its related array of documents 720. The array dialog 722 moves along with the array 720 when the array dialog 722 is locked and the array 720 is longitudinally moved. In contrast, the array dialog 722 doesn't move along with the array 720 when the array dialog 722 is unlocked and the array 720 is longitudinally moved.

Mini Map of Arrays of Documents and End of Arrays of Documents Identification

Figure 23:
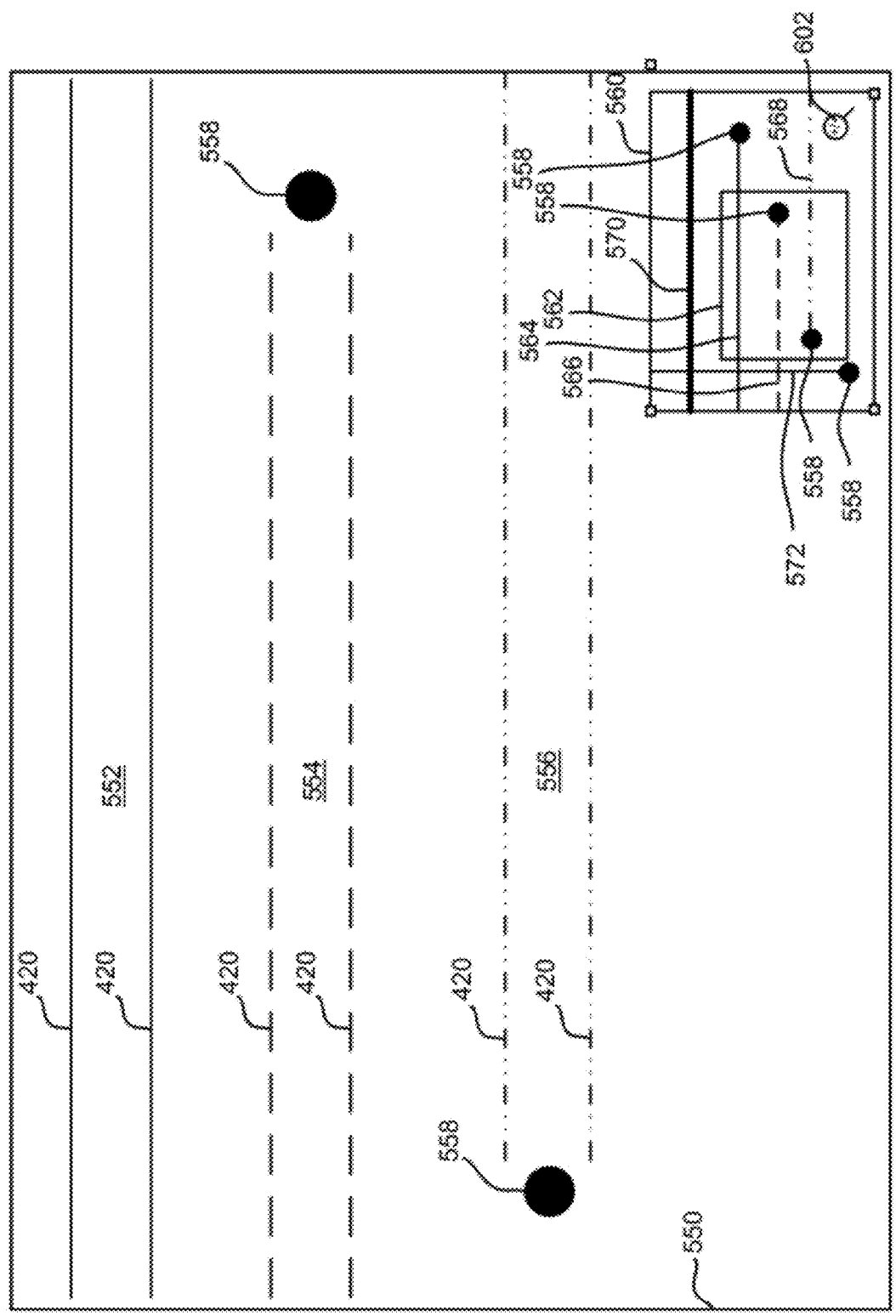
FIG. 23 is an illustrative schematic view of a display displaying a mini-map in accordance with an embodiment of the present invention.

FIG. 23 illustrates a display area 550 showing three arrays of documents 552, 554, 556. Only a central portion of array of documents 552 is visible on the display area 550. The right end of the array of documents 554 is visible on the display area 550 and marked with an end of array mark 558. The left end of the array of document 556 is visible on the display area 550 and marked with an end of array mark 558. The end of array mark 558 clearly marks the end of an array of documents after the last document or before the first document on their respective timelines. Each end of array mark 558 can be customized to the taste of the user by changing the shape, the size and the color perhaps to add more meaning to the array of documents. It can also be appreciated each array of documents 552, 554, 556 are illustrated with a discriminating array border 420 thus improving the distinctiveness of each array of documents despite only a portion of each array is visible.

Still on FIG. 23, a mini-map 560 is illustrated. The mini-map 560 illustrates what is seen on the display area 550 with frame 562. The same arrays of documents 552, 554, 556 are schematically illustrated inside the frame 562 by respective lines 564, 566, 568 with their related end of array mark 558. The mini-map 560 provides an extended view of what is found outside the display area 550, 562 to add perspective to the user's view. In the present example array of document 570 and intersecting array of documents 572 are not visible on the display area 550 but are visible on the mini-map 560. It can be appreciated that each schematic array of documents 564, 566, 568 are displayed with a line type that is associated with the line-type of the array borders 420 as displayed on the display area 550.

Figure 24:
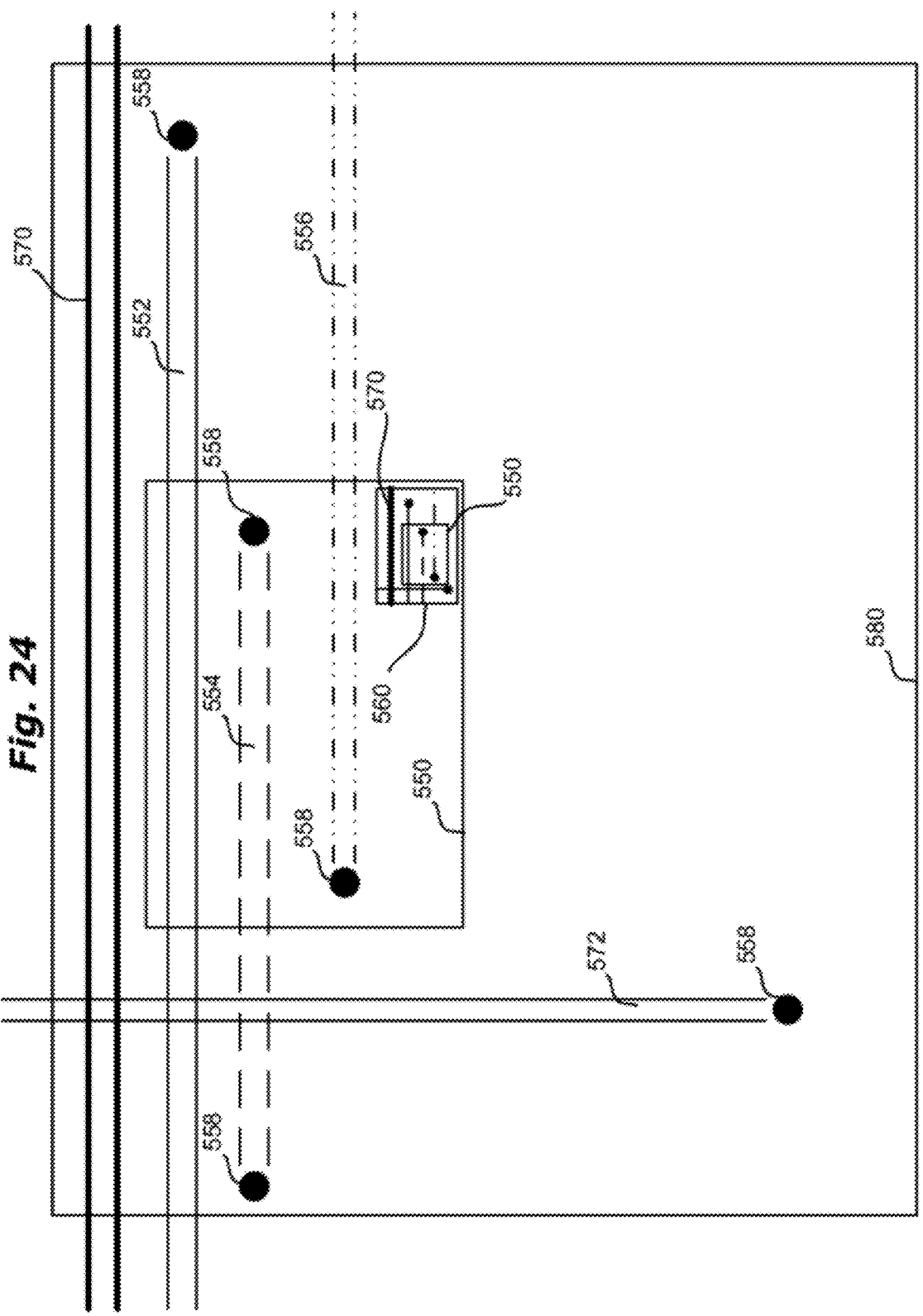
FIG. 24 is an illustrative schematic view of a display displaying a mini-map in accordance with an embodiment of the present invention.

The mini-map 560 provides the ability to drag the display area frame 562 to actually change what is displayed on the display area 550. Turning to FIG. 24 it can be appreciated the display area 550, the mini-map 560 and the actual realm 580 of what can be seen from the mini-map 560 with all corresponding arrays of documents 552, 554, 556, 570, 572. The mini-map 560 thus provides a way to see a wider area than what is actually visible on the display area 550 without compromising the zoom of the arrays of documents 552, 554, 556 shown on the display area 550.

Figure 25:
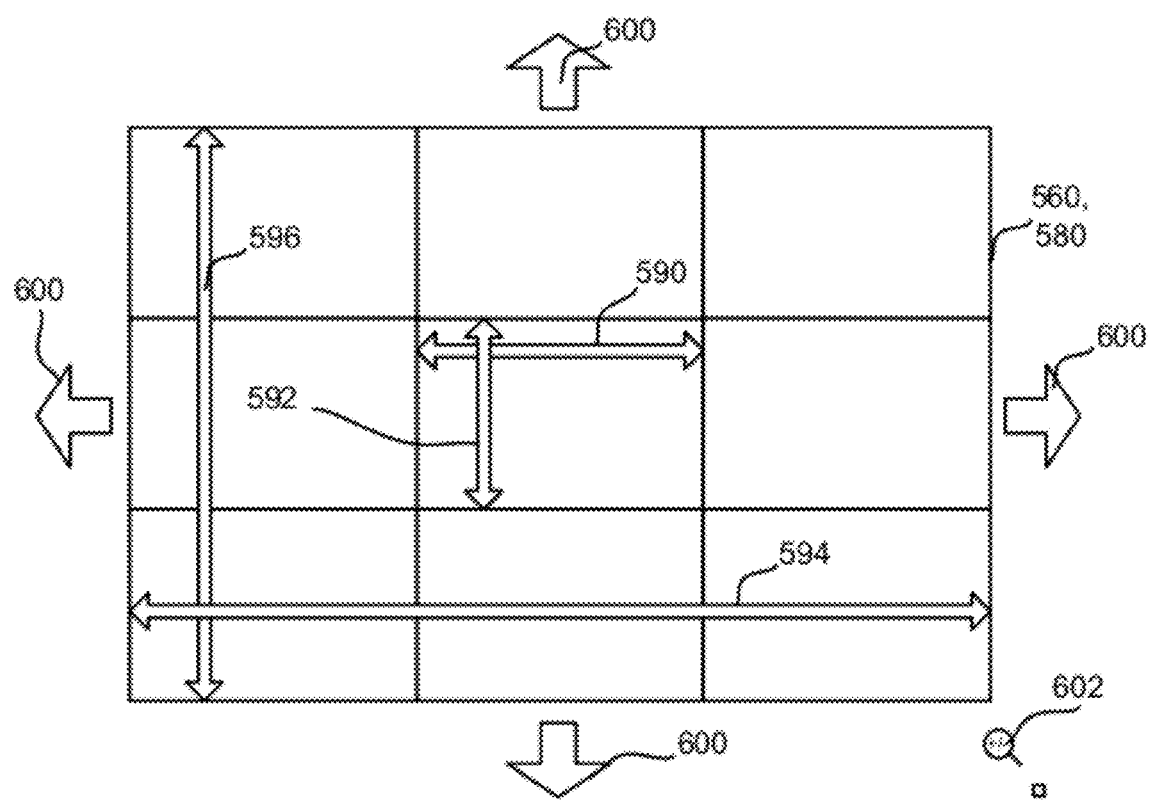
FIG. 25 is an illustrative schematic view a mini-map in accordance with an embodiment of the present invention.
Figure 26:
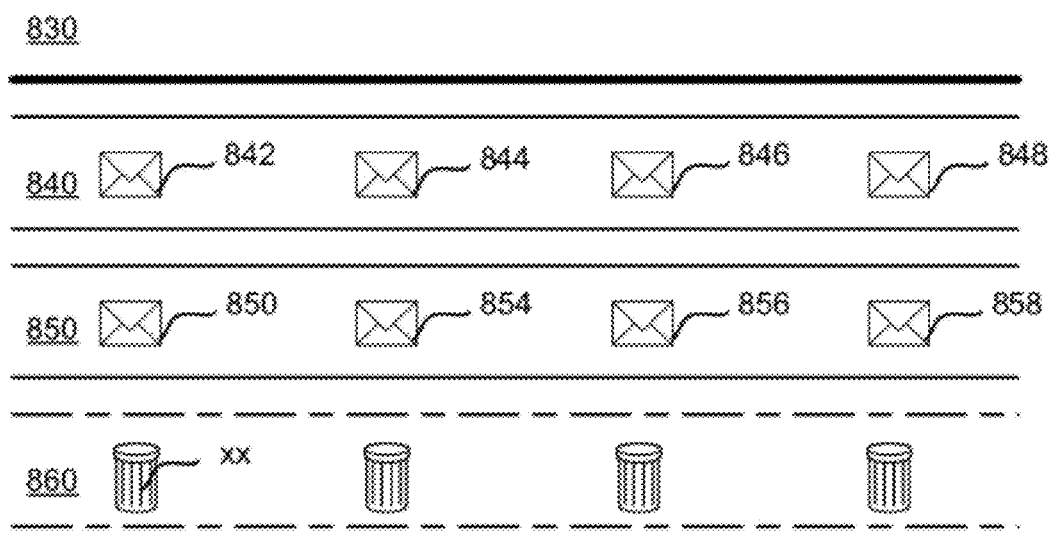
FIG. 26 is an illustrative schematic view of a juxtaposition of specialized arrays of documents in accordance with an embodiment of the present invention.

FIGS. 25 and 26 illustrate the mini-map proportion to ensure there is a useful additional visible area 560, 580 extending outside the size of the actual display area. One way to ensure there is proper additional viewing area is to set a fixed display area width 590 factor and a fixed display area height 592 factors. In the present example, as displayed on FIG. 25, the ratio is 1:3 meaning the mini-map 560 displays three times the width 594 and three times the height 596 of the actual display area 550. Therefore, each time the display area window 550 is moved in the mini-map 560 the view of the actual realm 580 of the mini-map is adjusted so there is meaningful additional viewing area available all around the display area window 550 of the mini-map 560. A different factor could be used without departing from the scope of the present invention. Additionally, the actual realm 580 of the mini-map 560 can be selectively adjusted using arrows 600 disposed on each side of the mini-map 560. Also, a mini-map zoom 602 is provided along with the mini-map 560 to change the strength of the zoom on the mini-map 560.

Specialized Arrays [e.g. E-Mails Array(s), Trash Array(s)]

FIG. 26 shows four arrays of documents 830, 840, 850, 860 from which one array 830 contains documents from a database, the next array 840 contains e-mails documents from an e-mail address, the third array 850 contains e-mail documents from another e-mail address and the last array 860 contains trashed documents. E-mail documents 842, 844, 846, 848 displayed on array "of e-mails" 840 could be separated in two distinct arrays (not shown), one displaying the received e-mails and the other displaying the sent e-mails. Conversely, many arrays of e-mails can be simultaneously displayed so that many e-mail addresses can be monitored and used simultaneously.

When a new e-mail is received it appears on the array of e-mails associated with the email address it has been received with. The received e-mail document, lets assume it is document 856, can remain in the received e-mail array and be viewed, replied to or put in the trash can from there. However, the user can move the received e-mail 856 to another array of document. One way of doing it is to associate at least one additional attribute to the received e-mail 856. This way, the received e-mail 856 will appear on the array of documents grouping and presenting documents having in common the attribute. One other way consists in dragging the e-mail document 856 in another array of documents. In doing so the attributes that have been selected to determine which documents appear on the array will be automatically associated with the dragged e-mail document 856. The latter option will be discussed further in view of FIG. 24 below. The same document 856 can be put in the trash by dragging the e-mail document 856 to the trash array 860. Trashed documents appear on the trash array 860 unless they are permanently deleted.

Additional arrays of e-mail documents can be enabled and displayed to show a subset of all the e-mail documents related to a single e-mail address. For instance an array of e-mail documents can be created to display only the e-mails received from a precise contact. Another array or e-mails can be created to show only the e-mail documents from three different contacts and having a file number attribute associated therewith. In other words, e-mails are dealt with just like other documents and can be associated with attributes and filtered by attributes and with e-mail specific attributes like an e-mail address or if the e-mail has been received or sent.

Document Drag and Drop Causing Association of Attributes

Figure 27:
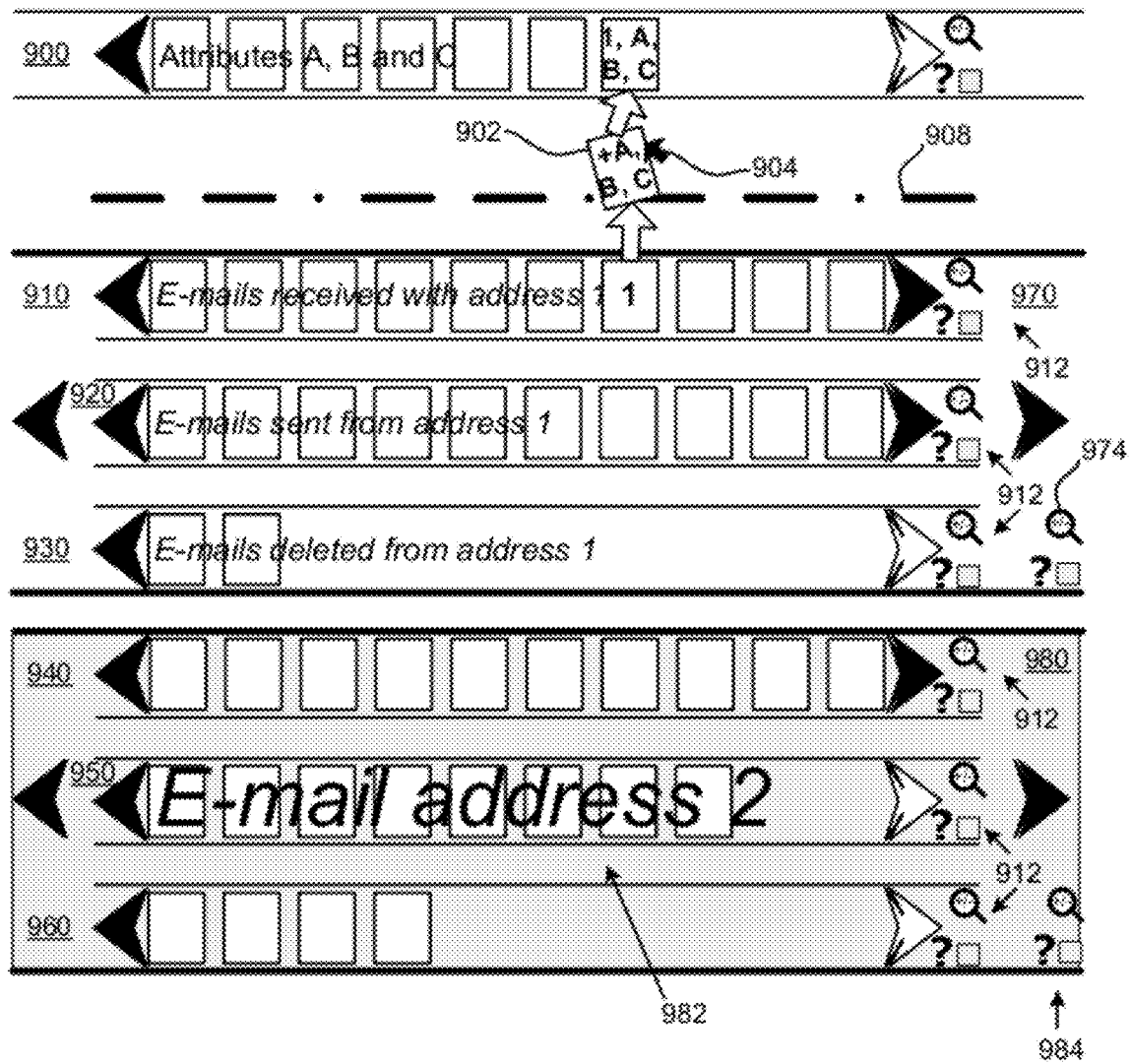
FIG. 27 is an illustrative schematic view of an association of attributes to a document performed on a dragged document to an array of documents in accordance with an embodiment of the present invention.

FIG. 27 shows two groups of arrays of documents 970, 980. The first group 970 comprises three arrays of documents 910, 920, 930 wherein the first array of documents 910 contains e-mail documents received with a first e-mail address, array of documents 920 contains e-mail documents sent using the first e-mail address and trash array of documents 930 contains a subset of all trashed documents and shows only trashed e-mail documents associated with the first e-mail address. Each array of e-mail documents 910, 920, 930 in group of array of documents 970 are identified in accordance with their role.

Group of array of documents 980 also contains three arrays of e-mail documents 940, 950, 950 related to a second e-mail address. The second group of arrays of e-mails 980 is shaded to visually discriminate all the arrays of e-mail documents related with the second e-mail address. The second group of arrays associated with the second e-mail address is also identified as such 982 as opposed to having each array individually identified like are arrays of documents in the first group of arrays 970. It can also be appreciated that each group of arrays 970, 980 are represented with their related navigation tools 974, 984. Similarly, each array of e-mail documents 910, 920, 930, 940, 950, 950, 960 is represented with their related navigation tools 912. All functions described above in respect with navigation tools are either workable with groups and arrays of e-mail documents as well.

FIG. 27 also illustrates the dragging of an e-mail document 902 from the array of received e-mails 910 to an array displaying documents associated with attributes A, B and C. Document 902 (because it is not exclusively limited to e-mail documents) is dragged with the pointing device 904 or other means for manipulating documents. By doing so, document 902 can be removed, or kept, in array of e-mail documents 910, it is up to the user to decide. Document 902 is also associated with the attributes A, B and C of array 900. If document 902, once it is dragged in array of document 900, is dragged back to array 910 from array 900, a dialog will ask the user if s/he wants to keep the associated attributes A, B, C or remove them. At this moment a selection of attribute to keep can be made. The same dialog can optionally be displayed when the document is to be associated with the attributes of the destination array of documents to make sure a proper selection of attribute can be made. In the latter situation, if not all the attributes of the destination array are selected, the dragged document will not show (at least not in the same fashion as the existing documents on the array) on the destination array that illustrates documents having all the attributes in the query used to generate the array.

In the context of this illustrative embodiment a single document is dragged although a plurality of documents could be dragged at the same time. Once the plurality of documents is selected on an array of documents, the whole selection of documents can be dragged to the desired array.

Another aspect of the invention is illustrated with FIG. 27. Each group of arrays of e-mail documents 970, 980 can be saved in a separate database. Array of documents 900 uses a distinct database to store its documents. On the display all groups and arrays are shown juxtaposed to each other, however their underlying documents are kept separated in distinct databases. This means that if a corrupted e-mail enters, lets say e-mail account "1", it will not risk to corrupt the other databases of e-mail "2" and array of documents 900. In other words there is a "graphical" firewall 908 that can be crossed only if the user decides to move an e-mail to another array/group. This is a safety measure helping to prevent any corruption of the "main" database of array of documents 900 in the event SPAM e-mails or infected e-mails, carrying viruses or Trojan horses, are received with an e-mail address and even displayed on an array of e-mail documents 910, 920, 930, 940, 950, 950, 960.

Other Potential Claims:

19. The graphical user interface of claim 17, further comprising a mechanism to add or remove an array of documents from the group of arrays of documents.

20. The graphical user interface of claim 17, further comprising a mechanism adapted to longitudinally displace at least one array of documents.

21. The graphical user interface of claim 17, further comprising a mechanism adapted to magnify at least one array of documents.

24. The computer system of claim 22, wherein the array management module further comprises a mechanism to add or remove an array of documents from the group of arrays of documents.

25. The computer system of claim 22, wherein the array management module is adapted to longitudinally locate at least one array of documents.

26. The computer system of claim 22, wherein the array management module is adapted to magnify at least one array of documents.

27. At least one tangible machine-readable medium comprising machine-executable instructions adapted to be executable by the machine, the machine-executable instructions providing a method comprising: displaying a first plurality of documents in a first array of documents; selecting a document from the first array of documents; and magnifying attributes related to the selected document.

28. The at least one tangible machine-readable medium comprising the method of claim 27, further comprising: selecting an attribute; and displaying documents having the selected attribute in a second array of documents.

29. A method of presenting a search query, the method comprising displaying at least a portion of the search query on an array of documents comprising search results.

30. At least one tangible machine-readable medium comprising machine-executable instructions adapted to be executable by the machine, the machine-executable instructions providing a method comprising: providing a first plurality of documents in a first array of documents; providing a second plurality of documents in a second array of documents; saving the first and the second array of documents in a workspace; and displaying the workspace on a display.

31. At least one tangible machine-readable medium comprising machine-executable instructions adapted to be executable by the machine, the machine-executable instructions providing a method comprising: associating a document position offset with a first attribute; displaying a first plurality of documents in a first array of documents, each document being associated with at least one attribute; providing an array border; and offsetting the documents from the first array of documents having the first attribute associated therewith in a fashion adapted to discontinue the border.

32. At least one tangible machine-readable medium comprising machine-executable instructions adapted to be executable by the machine, the machine-executable instructions providing a method comprising displaying a first plurality of documents in a first axis of documents, each document being associated with at least one attribute and being imageless represented as a bar having a width of some pixels on a display.

32. A method of associating attributes with a document, the method comprising: providing a first array of documents displaying a plurality of documents having a first set of attributes thereof; providing a second array of documents displaying a plurality of documents having a second set of attributes thereof; and moving a document from the first array of documents to the second array of document to associate at least one attribute from the documents of the second array of documents.

33. The method of claim 32, wherein the movement of the document from the first array of documents to the second array of documents opens a dialogue adapted to select the attributes of the second array of documents to be associated with the document.

The description and the drawings that are presented above are meant to be illustrative of the present invention. They are not meant to be limiting of the scope of the present invention. Modifications to the embodiments described may be made without departing from the present invention, the scope of which is defined by the following claims:

What is claimed is:

1. A non-transitory computer-readable medium having stored thereon computer-readable instructions that, when executed by a computer, cause the computer to perform operations for adding a user-selectable element to a destination array or user-selectable elements on a display, the operations comprising:
adding a user-selectable element from a group of departure user-selectable elements, adapted to be grouped on the display along a first axis to provide a visual continuity between adjacent user-selectable elements thereof on a basis of a substantially rectilinear arrangement of user-selectable elements, to a destination array of user-selectable elements, the destination array of user-selectable elements being adapted to group a plurality of user-selectable elements having a commonality, the group of destination user-selectable elements being adapted to be grouped on the display along a second axis to provide a visual continuity between adjacent user-selectable elements thereof on a basis of a substantially rectilinear arrangement of user-selectable elements, the group of departure user-selectable elements and the group of destination user-selectable elements being adapted to be acted upon independently, the added user-selectable element being adapted to acquire the commonality by being added to the destination array of user-selectable elements,
wherein the acquired commonality is adapted to be removed from the added user-selectable element when the added user-selectable element is removed from the group of destination user-selectable elements.

2. The non-transitory computer-readable medium of claim 1, wherein the destination array of user-selectable elements disposes user-selectable elements along a timeline.

3. The non-transitory computer-readable medium of claim 1, wherein the commonality is at least one attribute.

4. The non-transitory computer-readable medium of claim 3, wherein the at least one attribute is a plurality of attributes and the attributes to be acquired by the added user-selectable element are selected on a basis of a user input.

5. The non-transitory computer-readable medium of claim 1, wherein the destination array groups documents resulting from a search, the commonality being at least one attribute used in a search query thereof.

6. The non-transitory computer-readable medium of claim 1, wherein the added user-selectable element is adapted to be dragged on the array of user-selectable elements by a user to acquire the commonality.

7. The non-transitory computer-readable medium of claim 1, wherein the user-selectable element is displayed on a departure array of user-selectable elements from which the user-selectable element to be dragged to the destination array of user-selectable elements.

8. The non-transitory computer-readable medium of claim 7, wherein the user-selectable element to be added is adapted to be dragged from the departure array of user-selectable element to the destination array of user-selectable elements with a graphical animation allowing a user to see a movement of the user-selectable element to be added.

9. The non-transitory computer-readable medium of claim 1, wherein the user-selectable element to be added is a document.

10. The non-transitory computer-readable medium of claim 1, wherein the axis of user-selectable elements is scrollable.

11. The non-transitory computer-readable medium of claim 1, wherein removing or keeping the commonality associated with the user-selectable element is decided on a basis of a user input.

12. The non-transitory computer-readable medium of claim 1, wherein adding the user-selectable element is adding collectively a plurality of user-selectable elements.

13. The non-transitory computer-readable medium of claim 1, wherein the user-selectable to be added to the destination array of user-selectable elements is stored in a first database and is further stored in a second database on a basis of its addition to the destination array of user-selectable elements.

14. A method of adding a user-selectable element to a destination array of documents on a display, the method comprising:
adding a document from a group of departure documents, adapted to be grouped on the display along a first axis to provide a visual continuity between adjacent documents thereof on a basis of a substantially rectilinear arrangement of documents, to the destination array of documents, the destination array of documents being adapted to group a plurality of documents having a commonality, the group of destination documents being adapted to be grouped on the display along a second axis to provide a visual continuity between adjacent documents thereof on a basis of a substantially rectilinear arrangement of documents, the group of departure documents and the group of destination documents being adapted to be acted upon independently, the added document being adapted to acquire the commonality by being added to the destination array of documents,
wherein the acquired commonality is adapted to be removed from the added document when the added document is removed from the group of destination documents.

15. The method of claim 14, wherein the destination array of documents disposes documents along a timeline.

16. The method of claim 14, wherein the commonality is a plurality of attributes and the attributes to be acquired by the added document are selected on a basis of a user input.

17. The method of claim 14, wherein the destination array groups documents resulting from a search, the commonality being at least one attribute used in a search query thereof.

18. A device, comprising a processor configured to present to a user a graphical interface for navigating axes of elements, the graphical interface comprising:
a first display area that is operable to display a group of departure user-selectable elements adapted to be disposed on the graphical interface along a first axis to provide a visual continuity between adjacent user-selectable elements on a basis of a substantially rectilinear disposition of user-selectable elements;

a second display area that is operable to display a group of destination user-selectable elements sharing at least one attribute, the group of destination user-selectable elements being adapted to be disposed on the graphical interface along a second axis to provide a visual continuity between adjacent user-selectable elements on a basis of a substantially rectilinear disposition of user-selectable elements, the group of departure user-selectable elements and the group of destination user-selectable elements being adapted to be acted upon independently; and a command area that is operable to select a user-selectable element from the first display area and add the selected user-selectable element to the second display area, the added user-selectable element being adapted to acquire the at least one attribute on a basis of the its addition of the selected user-selectable element to the second display area, wherein the acquired at least one attribute is adapted to be removed from the added user-selectable element when the added user-selectable element is removed from the group of destination user-selectable elements.

19. The device of claim 18, wherein the destination user-selectable elements are disposed along a timeline.

20. The device of claim 18, wherein removing or keeping the at least one attribute acquired by the user-selectable element is decided on a basis of a user input.

* * * * *